(12) United States Patent
Jankura et al.

(10) Patent No.: US 10,982,806 B2
(45) Date of Patent: Apr. 20, 2021

(54) CLOSE-PACK, HIGH-ASPECT-RATIO CAMERA TRIPOD

(71) Applicant: Peak Design, San Francisco, CA (US)

(72) Inventors: Robb Jankura, San Francisco, CA (US); Matthew Thomas James, San Francisco, CA (US); Peter Dering, San Francisco, CA (US); Peter Lockett, San Francisco, CA (US); Arthur Viger, San Francisco, CA (US); Andrew Wheeler Gans, San Francisco, CA (US); Kiran Malladi, San Francisco, CA (US)

(73) Assignee: Peak Design, San Francisco, CA (US)

( * ) Notice: Subject to any disclaimer, the term of this patent is extended or adjusted under 35 U.S.C. 154(b) by 0 days.

(21) Appl. No.: 16/501,118

(22) Filed: May 13, 2019

(65) Prior Publication Data

US 2020/0363008 A1    Nov. 19, 2020

(51) Int. Cl.
| | |
|---|---|
| *F16M 11/28* | (2006.01) |
| *G03B 17/56* | (2021.01) |
| *F16M 11/24* | (2006.01) |
| *F16M 11/18* | (2006.01) |
| *F16M 11/04* | (2006.01) |
| *F16M 11/10* | (2006.01) |
| *F16M 11/12* | (2006.01) |

(52) U.S. Cl.
CPC ............. *F16M 11/28* (2013.01); *F16M 11/04* (2013.01); *F16M 11/10* (2013.01); *F16M 11/12* (2013.01); *F16M 11/18* (2013.01); *F16M 11/242* (2013.01); *G03B 17/561* (2013.01)

(58) Field of Classification Search
CPC ........ G03B 17/56; F16M 11/04; F16M 11/12; F16M 11/10; F16M 11/18
USPC .......................................................... 396/428
See application file for complete search history.

(56) References Cited

U.S. PATENT DOCUMENTS

| | | | | | |
|---|---|---|---|---|---|
| 2,143,606 | A | * | 1/1939 | Mooney ................. | F16M 11/10 248/183.2 |
| 3,601,028 | A | * | 8/1971 | Tertocha ................ | F16M 11/08 248/222.14 |
| 4,121,799 | A | * | 10/1978 | Michio .................. | F16M 11/14 248/171 |
| 5,267,712 | A | * | 12/1993 | Shen ..................... | F16M 11/105 248/179.1 |
| 5,826,121 | A | * | 10/1998 | Cardellini .............. | F16M 11/16 396/428 |
| 5,993,077 | A | * | 11/1999 | Jones ..................... | G03B 27/323 248/187.1 |

(Continued)

*Primary Examiner* — Clayton E. LaBalle
*Assistant Examiner* — Kevin C Butler
(74) *Attorney, Agent, or Firm* — Run8 Patent Group, LLC; Peter Miller; Leah Raddatz

(57) ABSTRACT

A tripod includes: a leg section; a hub section; and a head containing a stacked ring control system that enables a user to rapidly adjust pitch, yaw, and roll of a camera—mounted to the head—relative to the leg section and to rapidly install, lock, and remove the camera with a single hand in the same location. More specifically, the tripod includes a set of stacked control rings that fall to hand in one compact location and thus enable a user to manipulate the position of a camera mounted to the tripod and to quickly mount and dismount the camera from the tripod.

20 Claims, 24 Drawing Sheets

(56) References Cited

U.S. PATENT DOCUMENTS

| | | | | |
|---|---|---|---|---|
| 7,789,356 B1* | 9/2010 | Jones | ............... | F16M 11/16 |
| | | | | 248/178.1 |
| 2003/0226941 A1* | 12/2003 | Crain | ............... | F16B 7/1463 |
| | | | | 248/166 |
| 2003/0234326 A1* | 12/2003 | Crain | ............... | F16B 7/1463 |
| | | | | 248/166 |
| 2003/0235459 A1* | 12/2003 | Crain | ............... | F16B 7/1463 |
| | | | | 403/170 |
| 2004/0004168 A1* | 1/2004 | Crain | ............... | F16B 7/1463 |
| | | | | 248/188.8 |
| 2007/0090237 A1* | 4/2007 | Hsu | ............... | F16M 11/32 |
| | | | | 248/178.1 |
| 2010/0218670 A1* | 9/2010 | Keng | ............... | F41A 23/14 |
| | | | | 89/37.04 |
| 2010/0224745 A1* | 9/2010 | Orlov | ............... | F16M 7/00 |
| | | | | 248/188.3 |
| 2012/0181398 A1* | 7/2012 | Salvato | ............... | F16M 11/10 |
| | | | | 248/122.1 |
| 2015/0204479 A1* | 7/2015 | Bryant | ............... | F16M 11/041 |
| | | | | 348/376 |
| 2015/0338017 A1* | 11/2015 | De Faveri | ............... | F16M 11/16 |
| | | | | 396/428 |
| 2015/0346589 A1* | 12/2015 | Dering | ............... | G03B 17/561 |
| | | | | 396/428 |
| 2016/0263310 A1* | 9/2016 | Helbig | ............... | F16M 11/40 |

* cited by examiner

CLOSE-PACK, HIGH-ASPECT-RATIO CAMERA TRIPOD

FIELD

This invention relates generally to the field of photography and more specifically to a new and useful close-pack, high-aspect-ratio camera tripod in the field of photography.

DESCRIPTION OF THE EMBODIMENTS

Figure 1:
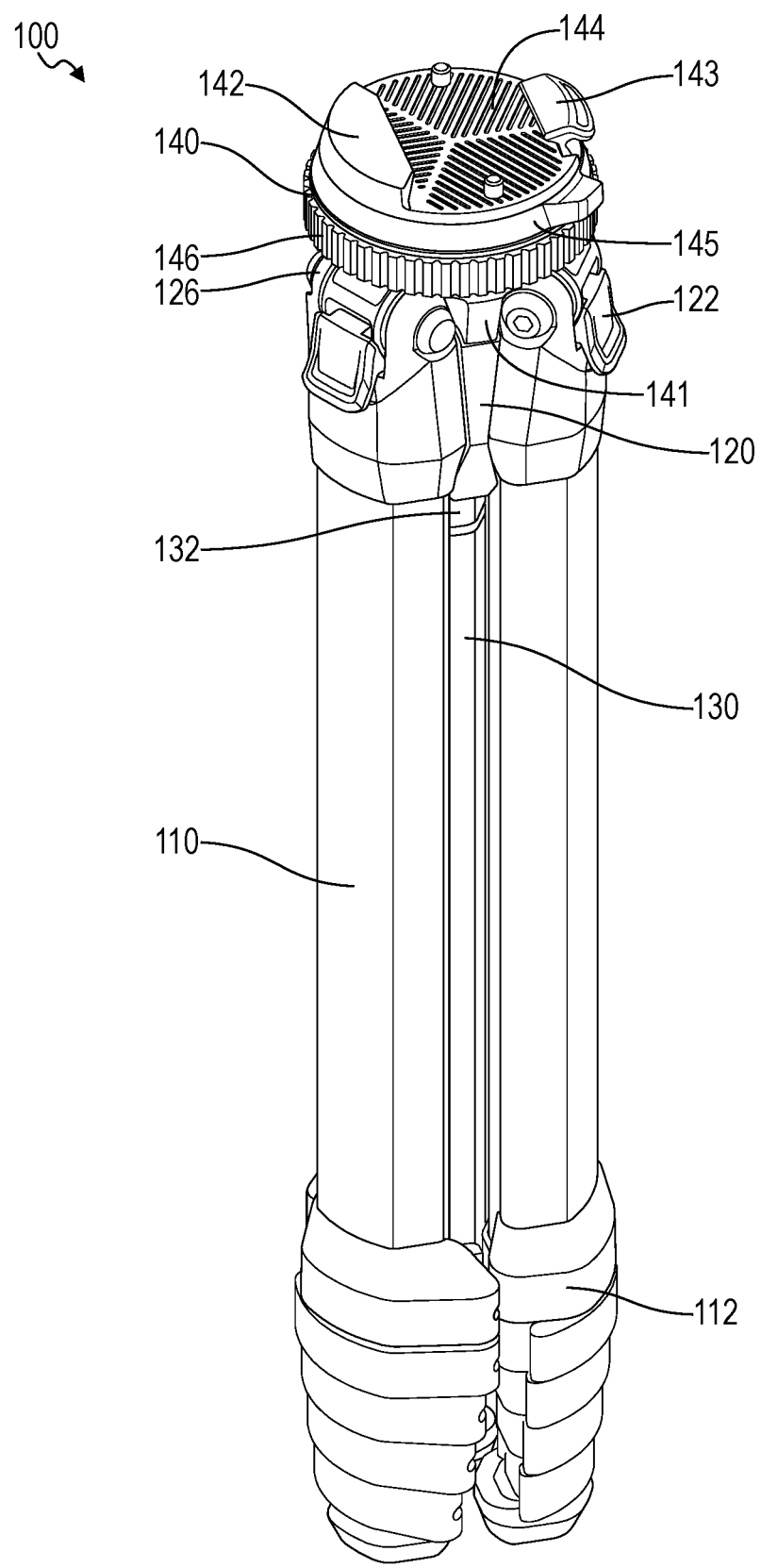
FIGS. 1-24 are schematic representations of a tripod.
Figure 2:
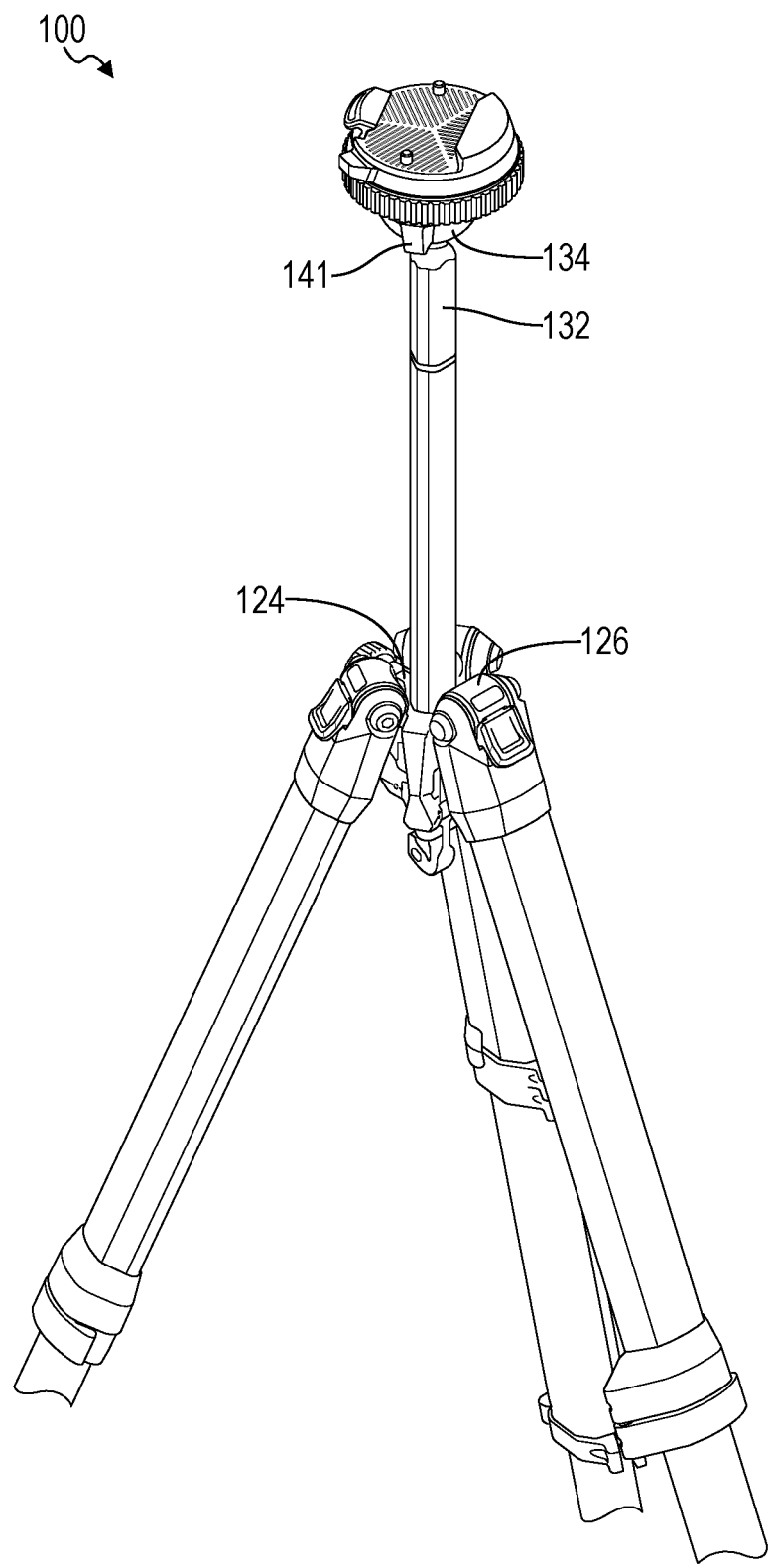
Figure 3:
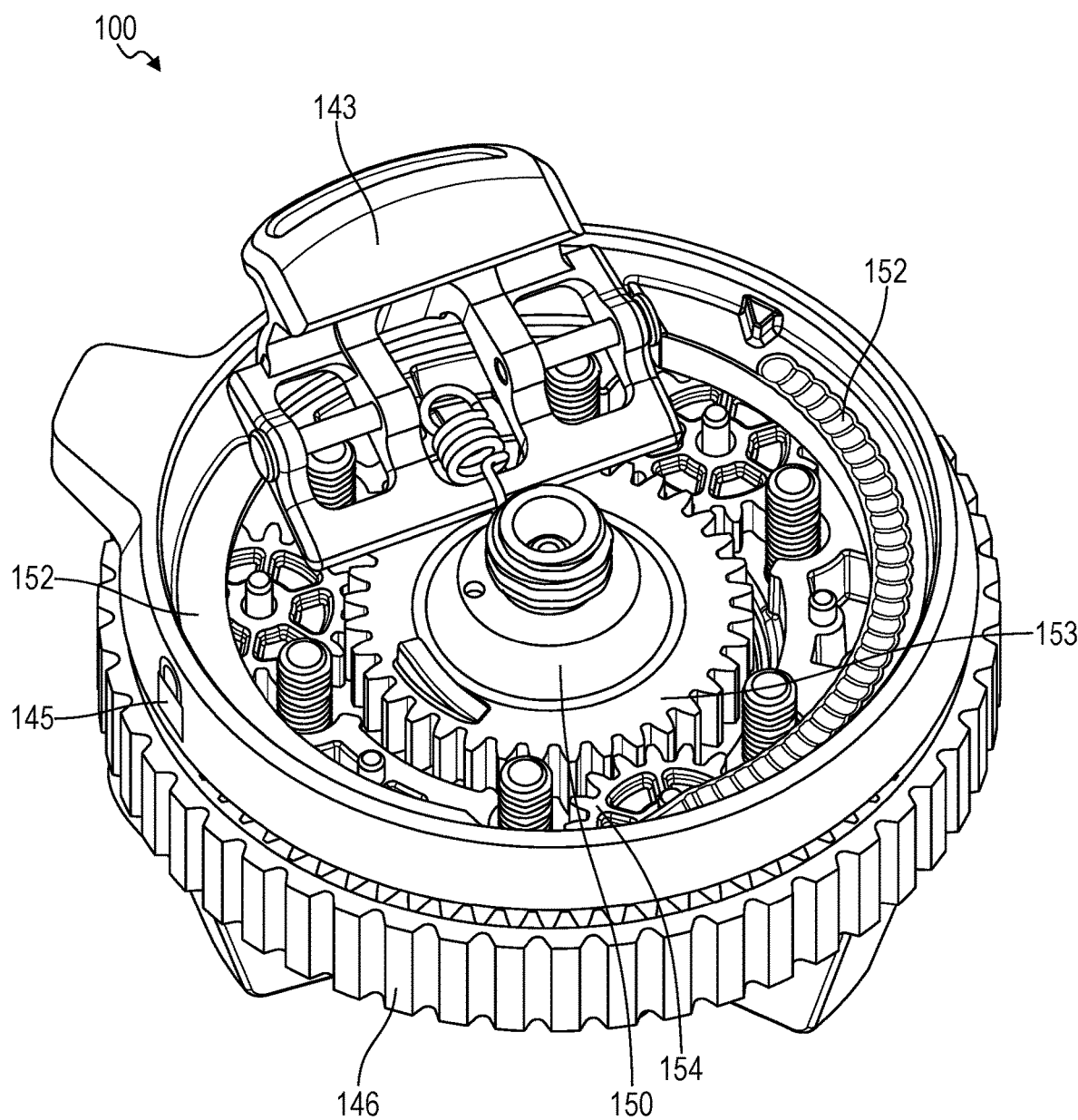
Figure 4:
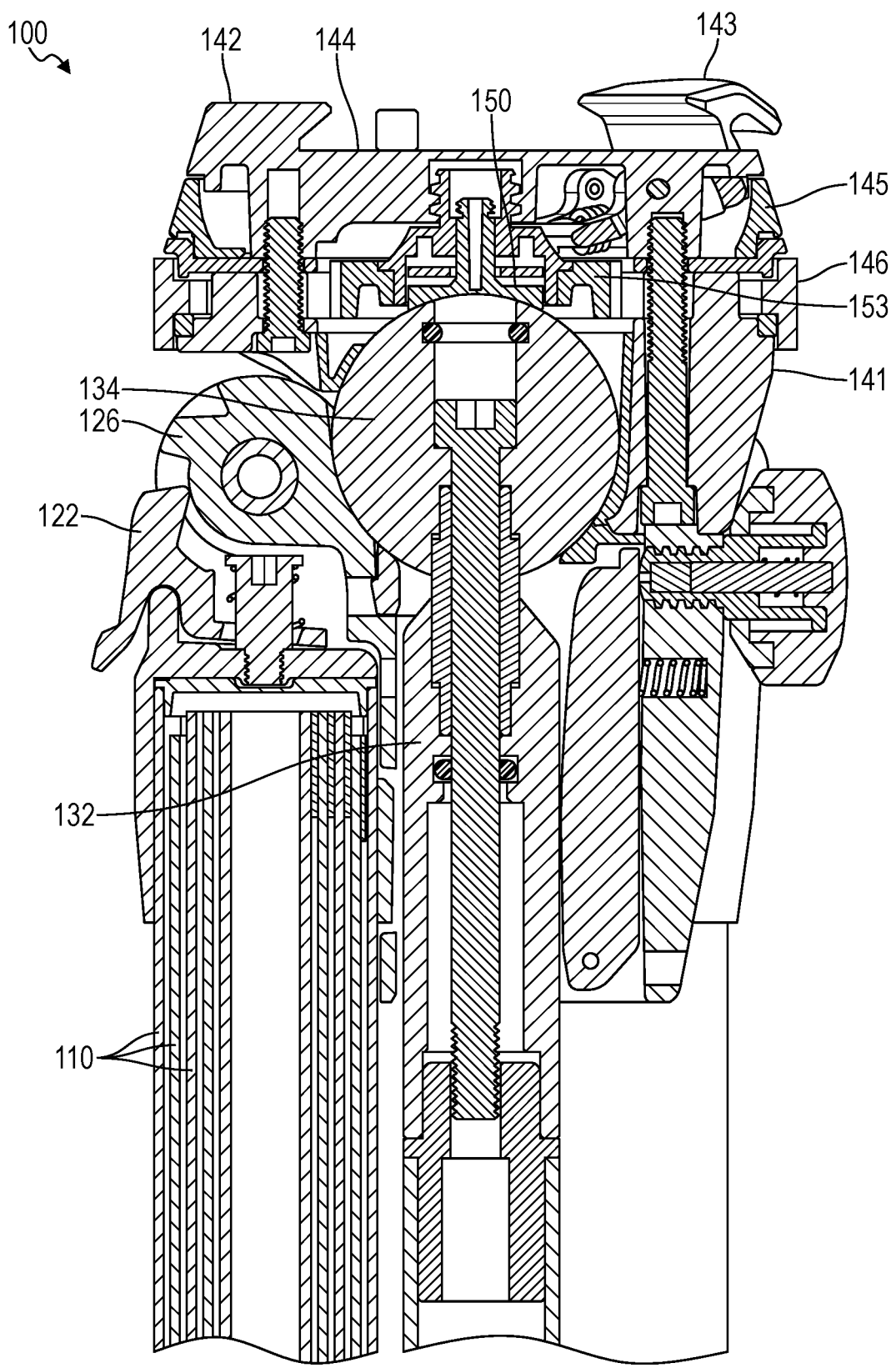
Figure 5:
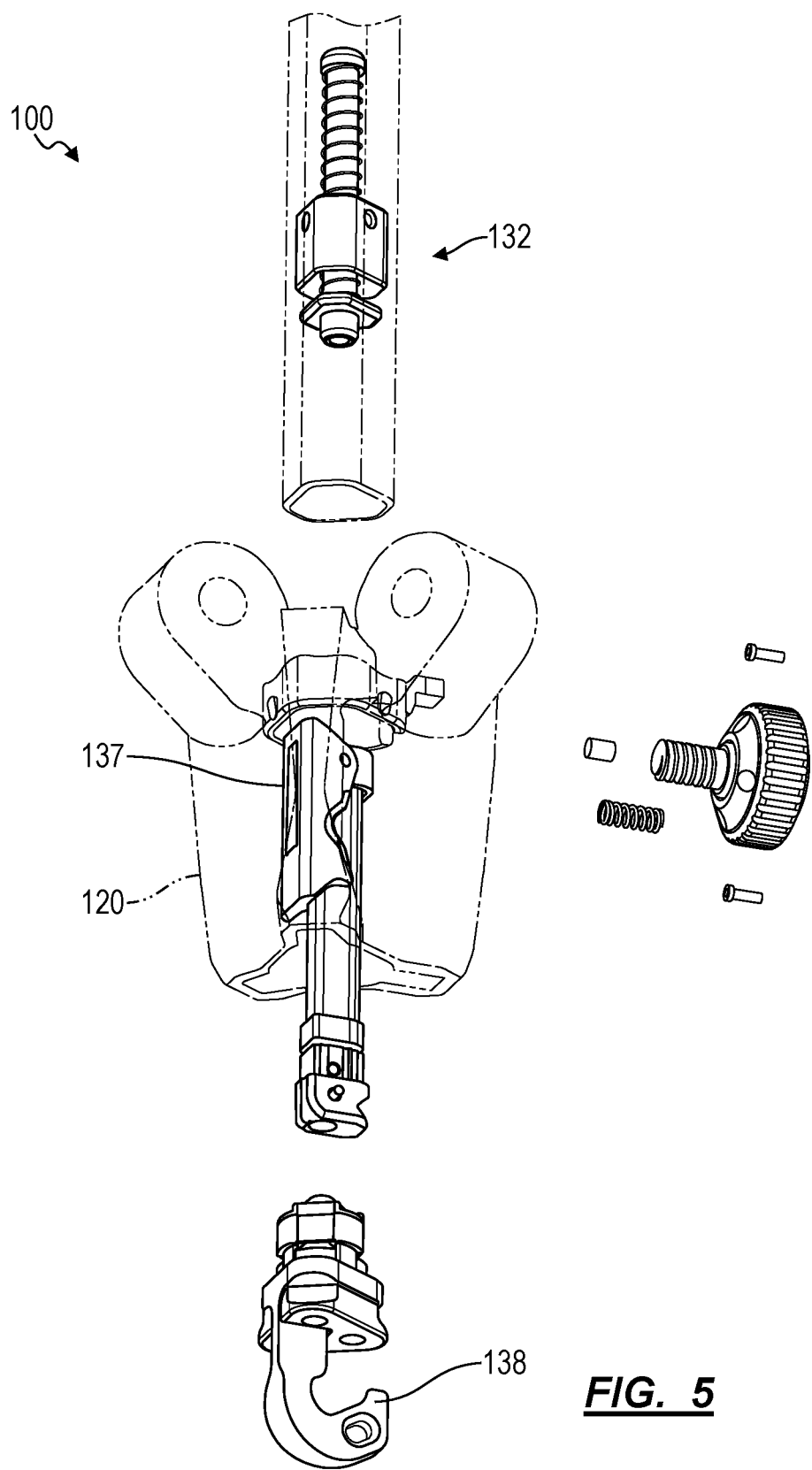

The following description of the embodiments of the invention is not intended to limit the invention to these embodiments but rather to enable a person skilled in the art to make and use this invention.

1. Tripod

As shown in FIGS. 1-24, a tripod 100 includes: a hub 126 defining a center bore 128 and a set of leg mounts 126 arranged in a radial pattern about the center bore 128; a set of legs, each leg in the set of legs configured to telescopically extend down from the hub 120 and pivotably couple to a leg mount 126 in the set of leg mounts 126; a center column 130 configured to translate within the center bore 128 of the hub 120 and comprising a spherical end 134 configured to nest between the leg mounts 126; and a chassis 140 pivotably coupled to the spherical end 134. The chassis 140 further includes: a base section; a camera platform arranged over the base section, defining a ridge 142 and a locking tab, and configured to transiently receive a camera adapter coupled to a camera; a set of flanges extending below the base section opposite the camera platform, extending around the spherical end 134, arranged in the radial pattern, and configured to nest between the leg mounts 126; a hat 150 arranged in the base section over the spherical end 134; a pivot control ring 146 arranged about the base section, configured to drive the hat 150 into the spherical end 134 fix an orientation of the chassis 140 on the spherical end 134 responsive to rotation in a first direction about the base section, and configured to retract the hat 150 from the spherical end 134 to unlock the chassis 140 from the spherical end 134 responsive to rotation in a second direction about the base section; and a camera lock ring arranged proximal the pivot control ring 146, concentric with the pivot control ring 146, and configured to drive the locking tab toward the ridge 142 to transiently lock a camera adapter between the locking tab and the ridge 142.

Generally, the tripod 100 includes a center rod/column, which defines a main axis, which (when the tripod 100 is in a fully collapsed state) can be coincident with the central axes of a chassis 140, hub 120, and leg system. The chassis 140 includes: a camera plate 144/interface (e.g., quick-release plate) orthogonal to the central axis of the chassis 140, with a locking mechanism radially operated about the central-axis of the chassis 140; a pivot locking mechanism (also radially-operated about the central-axis of the chassis 140); and a flanged socket, configured to receive a spherical end 134. The hub 120 includes: a central shaft configured to slidably receive the center column 130; ribs extending outward from the central shaft and containing a rocker bar configured to interface with the center column 130; and leg mounts 126 spaced between each adjacent pairs of ribs, and configured to interface with leg hinge-joints. The center column 130 includes a spherical end 134 at a first end, and a removable hanging hook at a second opposite end. The leg system includes a set of legs. Each leg of the leg system can include a series of nesting telescopic leg segments 110, and each leg segment 110 of the series can include a flip locking mechanism. Each leg connects to the hub 120 via a hinge-joint with a multi-stage locking mechanism 122.

2. Applications

Generally, the tripod 100 includes: a leg section; a hub 120; and a chassis 140 containing a stacked ring control system that enables a user to rapidly adjust pitch, yaw, and roll of a camera—mounted to the chassis 140—relative to the leg section and to rapidly install, lock, and remove the camera with a single hand in the same location. More specifically, the tripod 100 includes a set of stacked control rings that fall to hand in one compact location and thus enable a user to manipulate the position of a camera, and quickly mount and dismount the camera from the tripod 100. For example, the control rings can be concentric and stacked just below the camera mount and can be fully engaged and disengaged with less than one full turn, thereby allowing a user to quickly and easily move the chassis 140 a full 360-degrees in pan, easily move the is chassis 140 nearly a full 180-degrees in tilt (e.g., pitch and roll), and then fully and confidently lock the system in place without repositioning her hand or removing her hand from the chassis 140.

Furthermore, the stacked, concentric rings in the control system condenses the pan, tilt, and lock/unlock controls in one compact location, thereby: limiting features projecting outwardly from the chassis 140; minimizing effective diameter of the chassis 140; increasing compactness and space efficiency of the tripod 100 when fully collapsed; reducing weight of the tripod 100; and improving ease of transport, storage, and accessibility of the tripod 100 for a user.

The tripod 100 chassis 140 is mounted to a center column 130 configured to run inside a center bore 128 of the hub 120, and the hub 120 defines a set of leg mounts 126 that couple and support a set of legs. The center column 130 defines a spherical end 134, and the chassis 140 defines a set of flanges extending from the bottom of the chassis 140 to form a socket around the spherical end 134, which enables a user to tilt the chassis 140 relative to the hub 120. In particular, the chassis 140 defines a set of flanges arranged in a radial pattern matched to a radial pattern of leg mounts 126 extending from the hub 120 such that—when the tripod 100 is fully collapsed—the chassis 140 can be radially offset (e.g., by 60-degrees) from the hub 120 to enable the flanges and the leg mounts 126 to nest (or "interlock"), to encapsulate the spherical end 134, and to thus achieve high vertical and volumetric packing efficiency. The interlocking chassis 140, hub 120, and leg sections form a solid and robust collapsed state—such that the tripod 100 maintains a substantially uniform effective diameter when collapsed—which enables the user to pack away the tripod 100 without extraneous knobs or protrusions snagging on other equipment or bag flaps/openings. For example, when fully collapsed, the tripod 100 can approximate a cylindrical form with minimal negative space, thereby exhibiting high volumetric efficiency. Furthermore, in this example, the center column 130 can define a triangular section such that—when the center column 13 is fully retracted from the hub 120 with the chassis 140 nested around the leg mounts 126—the interior faces of the legs mate (or fall very near) the exterior faces of the center column 130, thereby minimizing negative space inside the cylindrical exterior form approximated by the tripod 100 in this collapsed state.

In one variation, the radial distance between flanges can be less than the radial width of the center column 130 such that the chassis 140 can tilt nearly 180-degrees about the spherical end 134 in both pitch and yaw directions. For example, a user may: shoot a first series of photos with her camera—installed on the chassis 140—retained in a landscape position by the chassis 140; and then manipulate the pivot control ring 146 to rapidly unlock, tilt, and relock the chassis 140 to relocate the camera in a portrait position. The user may also manipulate the pivot control ring 146 to loosen the chassis 140 on the spherical mount in order to enable more subtle pitch adjustments of the camera in this portrait position, such as within a range of 120-degrees less a sum of radial widths of the center column 130 and one flange.

Each leg also includes a set of nested leg segments 110 (or "telescoping stages"), and the tripod 100 also includes a center column 130, all of which cooperate to enable the tripod 100 to expand to a height several times (e.g., four times) the height of the tripod 100 in the collapsed state. When opened, the tripod 100 can occupy a range of footprints and heights, thereby defining a robust structure for support of heavy camera equipment (e.g., sandbags in addition to telephoto lenses, etc.) and supporting a wide range of applications and uses for a photographer.

3. Chassis

The chassis 140 includes: a camera plate 144/interface (quick-release plate) situated orthogonally to the central axis of the chassis 140, with a camera tab control ring 145, (e.g., camera locking mechanism) radially operated about the central-axis of the chassis 140 to interface with an operable locking tab; a flanged socket configured to receive the spherical end 134 on the center column 13; a hat 150 interposed between the camera plate 144 and the spherical end 134; and a pivot control ring 146 (or "spherical end 134 locking mechanism") radially-operable about the central-axis of the chassis 140 to drive the hat 150 into and away the spherical end 134 to lock and release chassis 140 from the spherical end 134, respectively.

The camera plate 144 includes a substantially planar top surface configured to receive the base or side of a camera, camera mount, or adapter. The plate also includes a projected ridge 142 to mate against a side of a camera, camera mount, or adapter. The operable camera locking tab 143 cooperates with the ridge 142 to locate and retain a camera adapter mounted to a camera in order to restrict movement of the camera relative to the chassis 140. Furthermore, the chassis 140 can include a spring element that biases the camera locking tab 143 toward the ridge 142 in order to snap the camera adapter onto the camera plate 144 when the camera is offered up to the chassis 140. Moreover the camera tab control ring 145 can define a ramp 152 or cam that drives and retains the camera locking tab 143 toward the ridge 142 in order to lock the camera adapter between the camera locking tab 143 and the camera ridge 142. The camera locking ring slides around the central axis of the chassis 140. Therefore, the ridge 142, the camera locking tab 143, the spring element, and the camera tab control ring 145 can cooperate to enable a user to drop the camera onto the chassis 140 with her left hand and then—while the spring element drives the camera locking tab 143 against the camera adapter to loosely retain the camera on the camera plate 144—rotate the camera tab control ring 145 with her left hand to fully lock the camera to the chassis 140 (e.g., all while reaching for a lens in her camera bag with her right hand).

Then, the user may slip her left hand down (e.g., by approximately 10 millimeters) to locate her fingers off of the camera tab control ring 145 and onto the pivot control ring 146, rotate the pivot control ring 146 to loosen the chassis 140 on the spherical end 134, and adjust the tilt and pan of the chassis 140—and therefore the camera—relative to the hub 120 to locate a target scene in the field of view of the camera before retightening the pivot control ring 146. The user may begin shooting the target scene immediately thereafter.

Furthermore, the user may keep her left hand on the chassis 140 (with her fingers in contact with the pivot control ring 146) in order to make on-the-fly pan and tilt adjustments to the camera by loosening the pivot control ring 146 with her left hand, repositioning the chassis 140 with her left hand, and then retightening the pivot control ring 146 again with her left hand before resuming shooting.

Finally, the user may raise her left hand up the chassis 140 to engage the camera tab control ring 145 and rotate the camera tab control ring 145 to release the camera lock tab; the spring element can continue to bias the camera lock tab toward the ridge 142 in order to retain the camera on the chassis 140 until the user retrieves the camera (e.g., with her left hand) from the chassis 140.

Therefore, the chassis 140 can define a compact set of stacked controls that enable a user to rapidly and easily install, adjust, and remove a camera from the tripod 100 with a single hand.

3.1 Camera Plate

The camera plate 144 can be a substantially circular disc, which includes a top face including: a grooved surface for interfacing with a camera, camera mount, or adapter; a solid ridge 142/rail at a first end; and a pass-through for a movable ridge 142/rail (e.g., camera locking tab 143) at a second end, such that the solid ridge 142 and the camera locking tab 143 can receive and hold a camera, camera mount, or adapter. The camera plate 144 also includes a bottom face including: a threaded center bore 128 configured to receive the threads of the hat 150 (or a threaded shaft configured to thread into a threaded bore of the hat); a bore for a spring and a detent-pin; a set of threaded bores configured to receive fasteners; a first protrusion to interface with a spring for the operable camera locking tab 143 mechanism; a set of protrusions to partially restrict the movement of the operable tab; and a circular ridge 142 near the outer edge of the bottom face, which can interface with a circular ridge 142 of a camera tab control ring 145.

The camera plate 144 can be manufactured from aluminum, steel, or other appropriate material.

3.1.1 Camera Tab Control Ring

The camera tab control ring 145 (e.g., locking mechanism) includes an annular disc/ring, including: on a first face, a set of detents 151 on a first side configured to interface with a spring-loaded detent-pin; and on a second side, a ramp 152 configured to interface with the moveable tab such that rotating the annular disc about the central axis of the chassis 140 forces the movable tab into a series of locked positions along the ramp 152, which dynamically fastens the camera or camera mount/adapter to the camera plate 144. The locking mechanism includes an operable/moveable tab that actuates into a recess of the camera or camera mount/adapter to restrict movement of the camera. The tab can be spring-loaded and interface with a ramp 152 on a disc (e.g., camera tab control ring 145) parallel to the camera plate 144. As the disc rotates about the central axis of the chassis 140, the ramp 152 can force the tab into a fixed position, locking the camera (or camera accessory) to the camera plate 144. A series of detents 151 sit opposite the ramp 152 on the disc and interface with a spring-loaded detent-pin to stagger the locking positions of the tab.

In one variation, the camera tab control ring 145 includes a protrusion extending radially outward (e.g., a finger tab) to interface with a user's finger during one-handed manipulation. The annular disc can sit in a plane parallel to the camera plate 144. In one variation, the disc can be arranged immediately below the camera plate 144. The annular disc can be manufactured from plastic, carbon fiber, or any other appropriate material.

Therefore, the camera locking tab 143 can cooperate with the ridge 142 to engage and retain a camera plate 144—affixed to a camera—with minimal play and thus enable immediate operation of the camera mounted to the tripod 100. However, the camera tab control ring 145 can overdrive the camera locking tab 143 toward the ridge 142 and thus function as an ancillary lock for the camera plate 144.

3.1.2 Controls Chassis

The controls chassis 140 includes a substantially flat annular disc including: a central through-bore configured to allow a sun gear 153 of a planetary gear system to pass through; a set of bores configured to allow fasteners to pass through; on a first side, a set of bores configured to receive a set of planet gear 154 shafts/pins; and on a second side, a set of posts configured to restrict the movement of the moveable tab.

The controls chassis 140 can be substantially the same diameter as the control mechanisms.

3.1.3 Pivot Control Ring

The spherical end 134 locking mechanism includes an outer annular disc (e.g., outer ring gear) including: a splined outside surface configured for hand manipulation; a splined inner surface configured to mesh with a set of planet gears 154 of a planetary gear system.

The spherical end 134 locking mechanism also includes a set of planetary gears situated between the outer ring gear and a sun gear 153. The planetary gears each include a shaft/pin aligned along axes parallel to the central axis of the chassis 140, each of which interface with a set of bores in the controls chassis 140 and a set of bores in a flange socket top face. In one variation, the spherical end 134 locking mechanism can be situated immediately below the camera-plate locking mechanism (and occupy a plane parallel to the camera plate 144).

The sun gear 153 can be configured to thread into the center bore 128 of the chassis 140 and to pivot about this center bore 128 and can pass through the controls chassis 140 into a socket area occupied by a spherical end 134. For example, the center bore 128 and the sun gear 153 can define single- or double-lead ACME threads, which may limit friction between the threaded center bore 128 and the sun gear 153 when the sun gear 153 rotated via the pivot control ring 146.

The outer ring gear can be situated on the chassis 140 of the tripod 100 and can be accessible by hand. Rotating the outer ring gear rotates the planetary gears, which rotate the inner sun gear 153, which interfaces with threads built into the camera plate 144, which causes the inner sun gear 153 to translate linearly along the central axis of the planetary gear (the central axis of the planetary gear can be co-linear with the central gear of the chassis 140).

The planetary gear revolves around the central axis of the chassis 140. The height of the sun gear 153 of the planetary gear can be equal to greater than the height of the planet gears 154 plus the range of vertical motion of the planet gears 154. The sun gear 153 includes a central thread allowing for positioning the sun gear 153 along the central axis of the chassis 140. The sun gear 153 also includes a central concave cup section (e.g., friction hat) that actuates along the central axis of the chassis 140 in concert with the sun gear 153. The cup section interfaces with the ball of the ball and socket joint to restrict movement of the ball using friction.

The sun gear 153 can also define a friction hat 150 (herein the "hat") facing the spherical end 134. Thus, when the pivot control ring 146 is rotated in a first direction, the ring gear integrated into the pivot control ring 146 rotates the set of planetary gears, which in turn rotate the sun gear 153 in the first direction, thereby unthreading the sun gear 153 from the center bore 128 of the chassis 140, driving the hat 150 into the spherical end 134 below, and thus clamping the spherical against the flanges extending from the socket section around the spherical end 134 below. Similarly, when the pivot control ring 146 is rotated in the opposite direction, the ring gear rotates the set of planetary gears, which in turn rotate the sun gear 153 in a second direction, thereby threading the sun gear 153 into the center bore 128 of the chassis 140, retracting the hat 150 from the spherical end 134 below, and thus releasing the spherical from the flanges below.

In one implementation, the hat 150 can define a thrust bearing facing the spherical end 134, and the tripod 100 can further include a spring interposed between the thrust bearing and the sun gear 153. When the sun gear 153 is retracted from the spherical end 134, the spring can function to drive the hat 150 into the spherical end 134 in order to maintain some friction between the hat 150 and the spherical end 134, thereby retaining the chassis 140 relative to the spherical mount and preventing rotation of the chassis 140 relative to the spherical end 134, such as when a user rotates the pivot control ring 146 in the first direction to tighten hat 150 against the spherical end 134. More specifically, the spring and the hat 150 can cooperate to apply a torque to the spherical end 134 that exceeds a torque applied to the pivot control ring 146 in order to prevent rotation of the chassis 140 relative to the spherical end 134 when the pivot control ring 146 is rotated in the first direction to tighten the hat 150 onto the spherical end 134.

3.1.4 Panning Control Ring

In one implementation, the chassis 140 includes a panning ring. The panning ring can be situated in between the tab locking ring and the ball joint locking ring. The panning ring can be operated with one hand by actuating the ring radially about the central axis of the chassis 140.

3.2 Stacked Control Rings

The controls on the chassis 140 can be stacked on parallel planes, such that all controls are operated by rotating the respective control rings about a shared central axis (e.g., the central axis of the chassis 140). The stacked configuration allows a user to operate all controls using one hand, and creates a compact and robust form factor. The control rings can each have unique outer textures (e.g., splining, knurling, etc.), such that a user may discern each control ring by touch/feel alone.

To maintain a small form factor and small effective diameter, the chassis 140 can be free of screw-knobs or hand-knobs. Moreover, each control ring can be fully engaged or disengaged by a single turn (or less), such that a user may lock or unlock all control rings with a single motion.

3.3 Socket Section

Generally, the socket section of the chassis 140 includes a first side including: a central bore configured to receive a socket bushing 147 and ball joint; a set of bores configured to allow fasteners to pass through; and a set of bores configured to receive a set of planet gear 154 shafts/pins. A second side of the socket section includes a set of flanges extending downward from the chassis 140, which form an exposed socket configured to receive and hold a ball joint.

In one implementation the socket includes three flanges spaced at 120 degrees around the central axis of the chassis 140. The flanges can be configured to fit between the leg mounts 126 of the hub 120 when the tripod 100 is in a full or partially-collapsed state for vertical packing efficiency. Each flange includes a concave surface on a side facing the inner socket area. A socket bushing 147 can sit between the flanges and the spherical end 134. When the pivot control ring 146 is engaged, the reaction forces on the inner surfaces of the flanges engage with the socket bushing 147, which locks the spherical end 134 in a fixed position.

4. Hub

The hub 120 can include: a central shaft configured to slidably receive the center column 130; ribs extending outward from the central shaft and containing a locking mechanism configured to interface with the center column 130; and leg mounts 126 spaced between each adjacent pair of ribs, the leg mounts 126 configured to interface with leg hinge-joints.

Subsections of the leg mounts 126, the ribs, and the central shaft can combine to form a substantially hemispherical recess 124 configured to receive a lower section of the spherical end 134 such that, in a fully collapsed state, the flanges of the chassis 140 and the leg mounts 126 of the hub 120 and leg sections encapsulate the ball socket (e.g., spherical end 134). Nesting the ball socket within the chassis 140 and hub removes negative space, and increases vertical and volumetric efficiency.

In one implementation, the hub 120 can include magnets configured to interact with magnetic areas of each other section, such that the tripod wo maintains a collapsed state in the absence of user interaction.

4.1 Center Bore

The center bore 128 of the hub 120 can be configured to receive and hold the center column 130 in place. Generally, the center bore 128 includes a non-circular cross-section to prevent the center column 130 from rotating within the center bore 128. The center bore 128 can include a shaft bushing (e.g., a rubber or bronze bushing) in order to limit wear on the center column 130 resulting from extension and retraction of the center column 130 in the hub 120 over time.

In one implementation, the center bore 128 defines a hexagonal cross section having irregular sides such that three non-adjacent faces of the center bore 128 each form the inner face of a hub rib, and the remaining three non-adjacent faces of the center bore 128 each form the inner face of the base of each leg mount 126 section.

4.2 Hub Ribs

The hub 120 includes a set of ribs extending outward from the central shaft. Each rib can include an inner space to hold either a primary or secondary locking mechanism configured to retain the center column 130 in a fixed or semi-fixed state. In one implementation, the space between each pair of ribs is configured to nest a leg of the tripod 100.

4.2.1 Center Column Locking Mechanism

A first rib of the hub 120 can include the primary locking mechanism. The primary locking mechanism can include a cambered rocker arm placed within the first rib and configured to apply force to the center column 130 when engaged by a threaded hand-screw. The rocker arm can be pinned at a bottom end of the rocker bar such that, when a hand-screw applies force at a top end of the rocker bar, the camber of the rocker bar (in connection with the top and bottom force points) creates an area of contact at a center area of the rocker bar. The camber of the rocker arm allows the rocker arm to disperse the force applied to the center column 130 thus allowing for a thin-walled center column 130.

A ball-detent locking mechanism can be disposed in a second rib of the hub 120. The ball-detent locking mechanism applies force in a first hub 120-plane orthogonal to the central axis of the tripod wo to hold the center column 130 in a temporarily fixed position. Additional ball-detent locking mechanisms can be placed in additional ribs of the hub 120. While the spring-loaded ball is in a position outside of the detent locations, the ball continues to apply force to the center column 130.

Spring-loaded ball bearings line up with sets of detents in the center column 130 to hold the center column in default positions (e.g., collapsed and partially deployed), which also signal ideal points at which the user may fully lock the center column 130.

4.3 Leg Mounts

Generally, the leg mounts 126 are configured to connect each leg of the leg section to the hub 120 at a hinge joint. The leg mounts 126 are also configured such that the flanges of the socket fit between the leg mounts 126 when the center column 130 is fully depressed into a collapsed state. In one implementation, the leg mounts 126 include a multistage locking mechanism, such that each leg can lock in at least a first and second configuration. In this implementation, the first configuration can be at 25-degrees (+/−2 degrees) offset from the center axis, and the second configuration can be at 85-degrees (+/−2 degrees) offset from the center axis.

4.4. Packed Configuration

The leg mounts 126 extend from the hub 120 and are arranged in a radial configuration about the center axis (e.g., at 0-degree, 120-degree, and 240-degree intervals). Furthermore, interior faces of the leg hub 120 mounts are relieved to enable the spherical end 134 to nest in hub 120—that is, the interior faces of the leg hub 120 mounts are relieved to enable the spherical end 134 to drop into the hub 120 and to be encapsulated within the leg mounts 126. The hub 120 also defines gaps (or "opens") between adjacent ends of adjacent leg mounts 126, and the flanges—extending downwardly from the chassis 140 and spaced radially about the central axis of the chassis 140 (e.g., at 0-degree, 120-degree, and 240-degree intervals, like the leg mounts 126)—define widths (slightly) less than the gap width between adjacent leg mounts 126 such that these flanges can nest in these gaps between leg mounts 126 when the tripod 100 is collapsed, thereby limiting total height and increasing volumetric efficiency of the collapsed tripod.

Furthermore, because the leg mounts 126 are relieved for the spherical end 134, the spherical end 134 can define a relatively large diameter, thereby enabling the flanges and the hat 150 to cooperate to apply a relatively large clamping force to the spherical end 134 and thus support relatively large cantilevered masses arranged on the) chassis 140 (e.g., a large telephoto lens installed on a camera mounted to the chassis 140) without increasing the height or reducing volumetric efficiency of the tripod 100 when collapsed. For example, the diameter of the spherical end 134 can be greater than a minimum distance from the top faces of the hub ribs to the bottom face of the pivot control ring 146 when the tripod 100 is collapsed.

Furthermore, the legs can include magnetic and/or ferrous elements arranged proximal their distal ends and configured to attract magnetic and/or ferrous elements in adjacent legs when the tripod wo is collapsed, thereby retaining these distal ends of the legs in close proximity and preventing inadvertent expansion of the legs during transport.

5. Center Column

The center column 130 can have a non-circular cross-section to prevent rotation within the center bore 128. Additionally, the cross-section can include a number of sides equal to double the number of flanges comprising the socket. In one implementation, the cross section of the center column 130 includes an irregular hexagon with a first set of three sides each having a first length, and a second set of three sides each having a second length. In this implementation the socket includes three flanges, and the hub 120 includes three ribs. The central column can be dynamically locked in place by a screw locking mechanism that screws into threads along an axis orthogonal to the central main axis.

In another implementation, the center column 130 can be broken down into a set of center column 130 modules. In this implementation, the center column 130 includes a short center column 132 and a long center column 130, wherein the short center column 132 can be formed from a different material than the long center column 130. The short center column 132 can be attached or detached from the long center column +via a fastener located within an access point inside the spherical end 134, accessible when the chassis 140 is actuated to a full 90-degree configuration. Moreover, modular instances of the center column 130 can be added to expand the total height of the tripod 100.

The short center column 132 can function as a center column 130. In one implementation, the short center column 132 can be tall enough to raise to a height sufficient to allow for full range of motion for the chassis 140. The short center column 132 can be separated from the long center column 130 via a fastener within an access point in the ball joint (e.g., spherical end 134), the access point accessible between the socket flanges 141 when the main plane of the chassis 140 is in a 90-degree orientation with respect to the main axis of the tripod 100 (i.e. the main axis of the center column 130).

Furthermore, when legs are deployed during operation but the center column 130 remains retracted, the chassis 140 can remain nested in the hub 120 such that the hub 120 mechanically engages and retains the chassis 140, thereby enabling the chassis 140 to support a large cantilevered load (e.g., a telephoto lens) rather than rely on friction between the socket flanges 141, hat 150, and spherical end 134 to support this load.

5.1 Spherical End

The spherical end 134 can connect to a first end of the center column 130. Generally, the spherical end 134 can be housed in a socket of the chassis 140, such that the chassis 140 can pivot about the spherical end 134. The spherical end 134 can include a non-scratch outer covering.

5.2 Hanging Hook

A hanging hook can connect to a second end of the center column 130, such that a user may hang a bag or weight from the hanging hook for additional stability. Generally, the hanging hook includes: a first projection having a first cross section including a profile matching an inner cross-section of the center column 130; a retractable second projection having a second cross section matching an outer cross-section of the center column 130; and a hook. The first projection can include a set of bosses configured to fit a set of detents on the inner walls of the center column 130. While retracted, the second projection allows for turning the first projection inside the center column 130, such that the set of bosses can access the set of detents. When not retracted, the second projection restricts rotation of the hanging hook within the center column 130 by filling the (non-circular) interior cross-section of the center column 130.

In one implementation, the hanging hook can also function as a hard stop for the center column 130, thereby preventing a user from unintentionally withdrawing the center column 130 fully out of the center bore 128 when raising the center shaft to a maximum height above the hub 120. Thus, to release the center column from the hub 120, the user may first remove the hanging hook from the bottom end of the center column 130. (After removing the center column 130 from the hub 120, the user may also retrieve a mobile from inside the center column 130, as described below.)

Furthermore, the hanging hook can extend near feet at the end of the legs when the tripod 100 is fully retracted such that the hook is physically accessible when the tripod 100 is fully retracted, thereby enabling a user to hook the tripod 100 directly to a bag (e.g., a camera or equipment bag) via the hanging hook for simple transport of the tripod 100.

5.3 Mobile Mount

The tripod 100 can also retain a collapsible mobile phone mount (hereinafter "mobile mount") within the center column 130. Generally, the mobile mount can be configured to receive and hold a mobile phone. The mobile mount can collapse down to a diameter less than the diameter of the center column 130. In one variation, the mobile mount is spring-loaded and magnetically attached within the center column 130, such that—upon removal of the hanging hook at the end of the center column 130—the mobile mount ejects itself from the center column 130 and expands into a deployed configuration for a user to clamp a mobile phone into, and then fix the mobile mount onto the camera plate 144 of the tripod 100.

In another variation, magnetic elements in the mobile mount can transiently retain the mobile mount in the center column 130. Additional magnetic elements in the center column 130 can draw the mobile mount out of the center column 130 by sliding the center column 130 along the center bore 128 of the hub 120. Moreover, the magnetic elements can also communicate tactile feedback to the user that the center column is reaching the end of its range of motion.

6. Legs

Each leg includes leg sections configured to nest within an adjacent leg section by sliding along a shared axis. Smaller leg sections can be locked in place by a set of leg section locks 112. The leg section locks 112 are activated by flip locks that abut each leg joint. The height of the locking mechanisms can be much shorter than each leg stage. In one implementation the legs include five stages of leg sections.

Each leg can splay outward from a central vertical axis up to an angle defined by a multistage locking mechanism. Actuating the multistage locking mechanism allows each leg to splay further up to at least a second angle defined by the locking mechanism.

Each leg can include a shaft with six faces, three inward-facing and three outward-facing, such that when the tripod 100 is in a fully collapsed state, each of the inward faces of each leg sit parallel with an inward face of an adjacent leg or a face of the central column.

Figure 6:
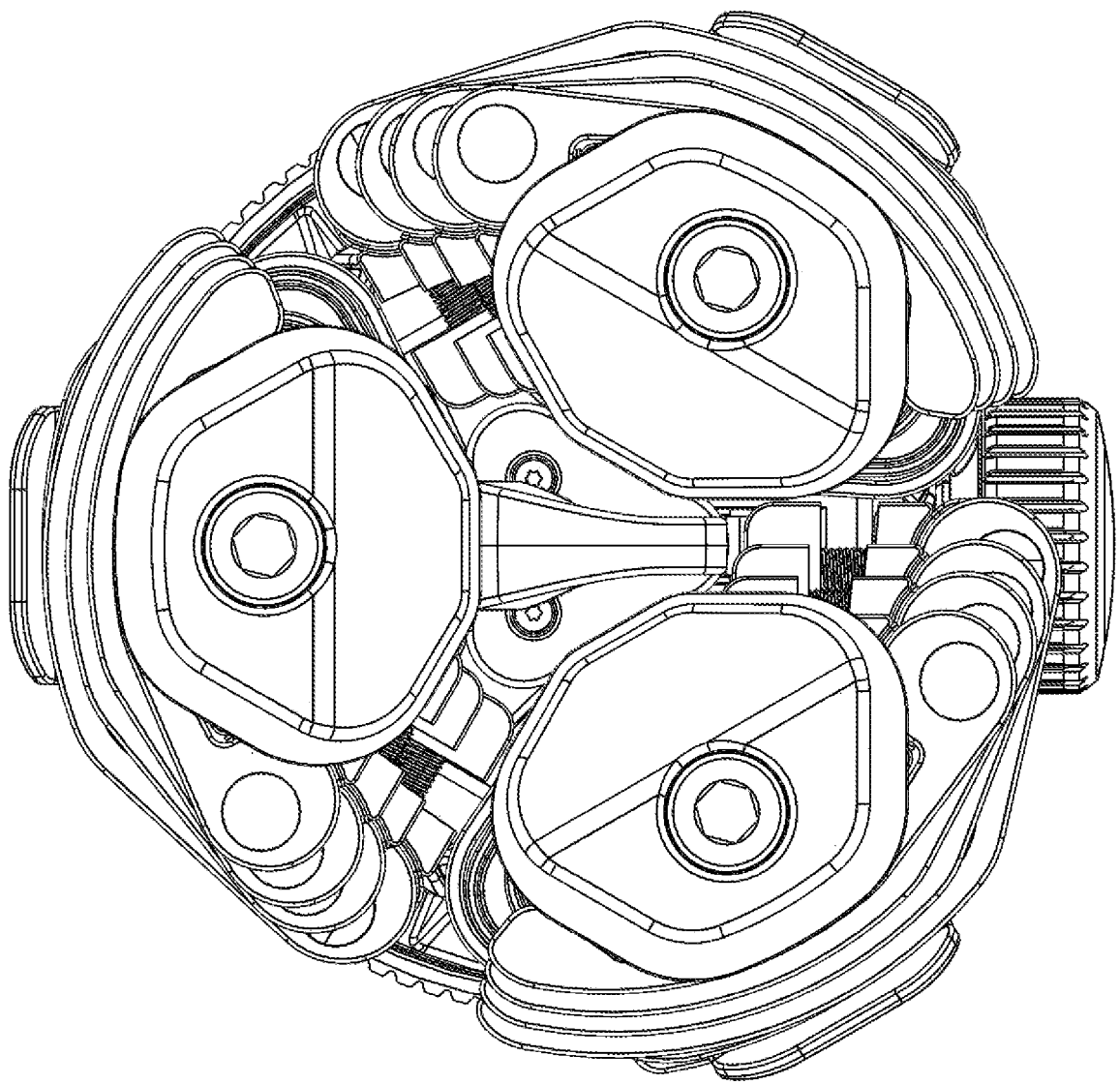
Figure 7:
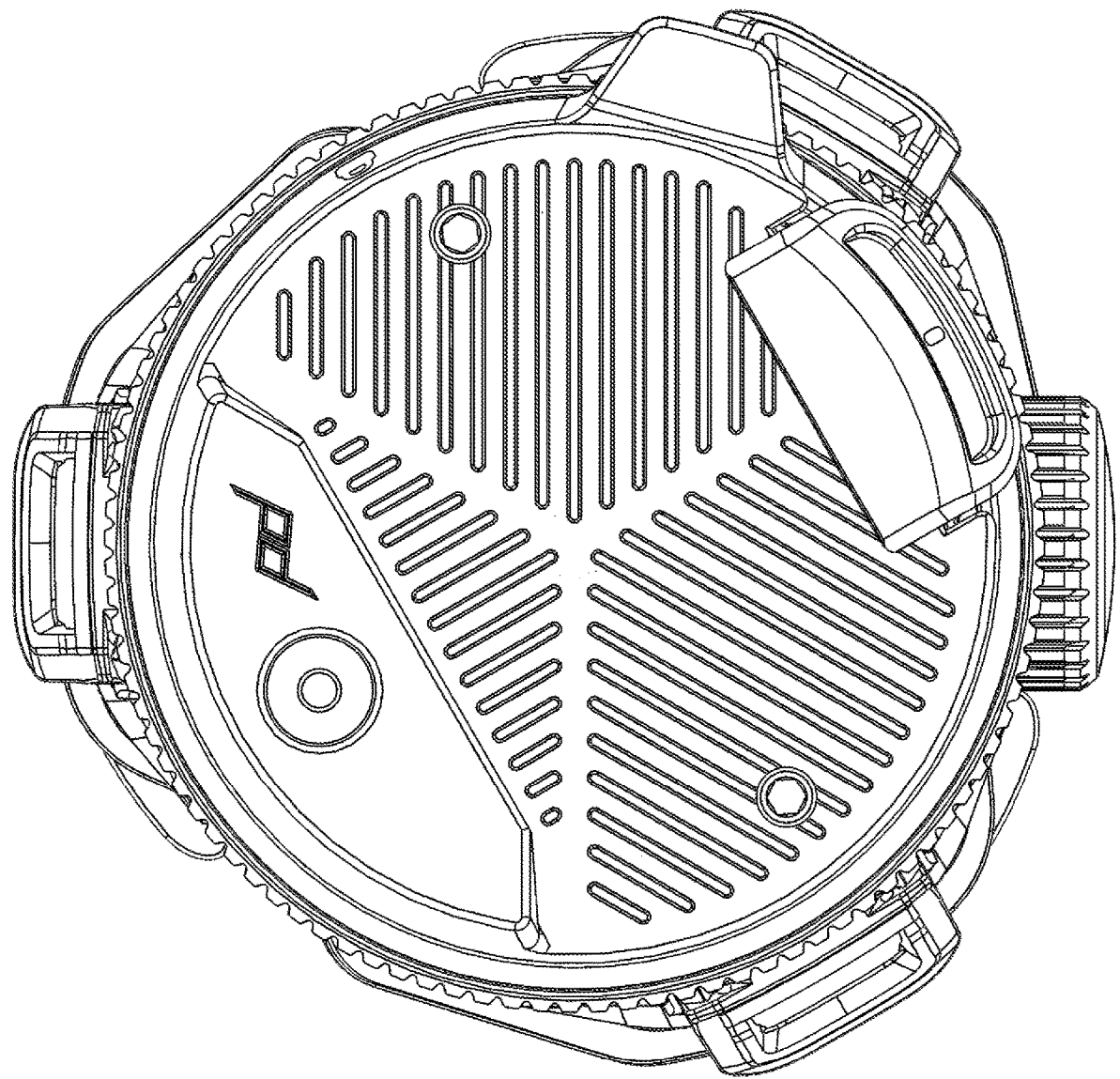
Figure 8:
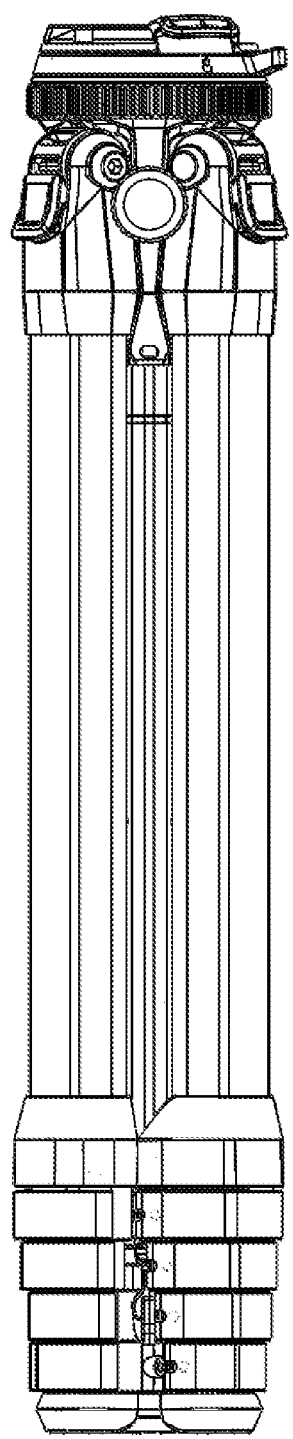
Figure 9:
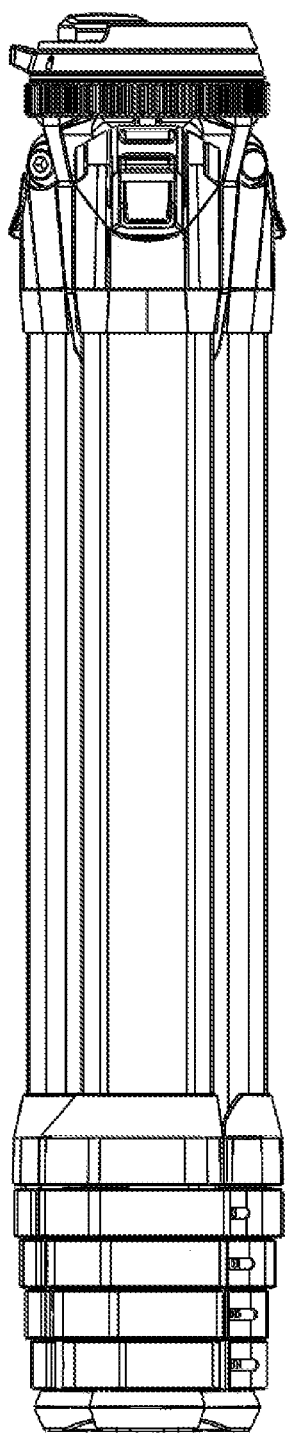
Figure 10:
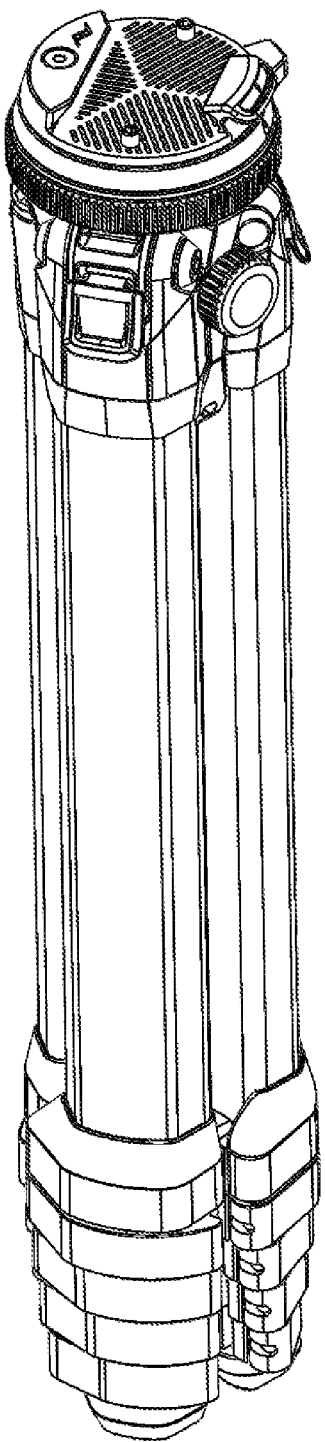
Figure 11:
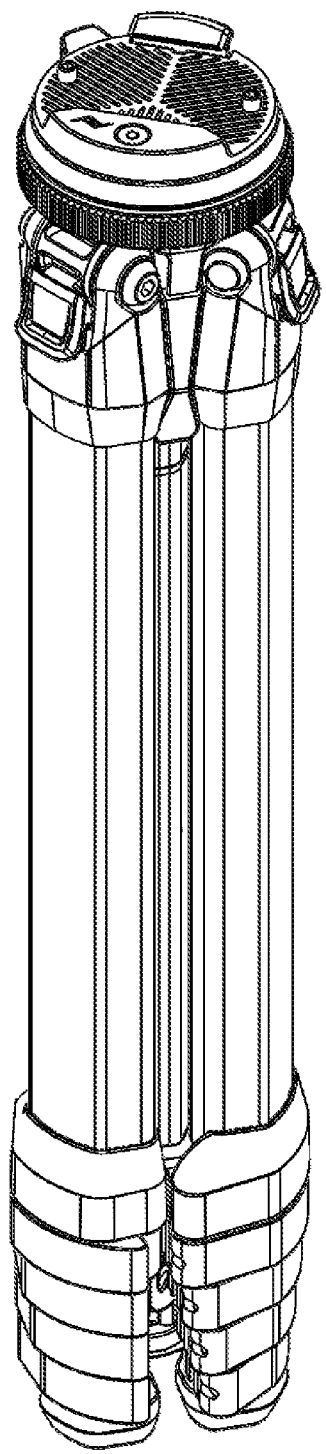
Figure 12:
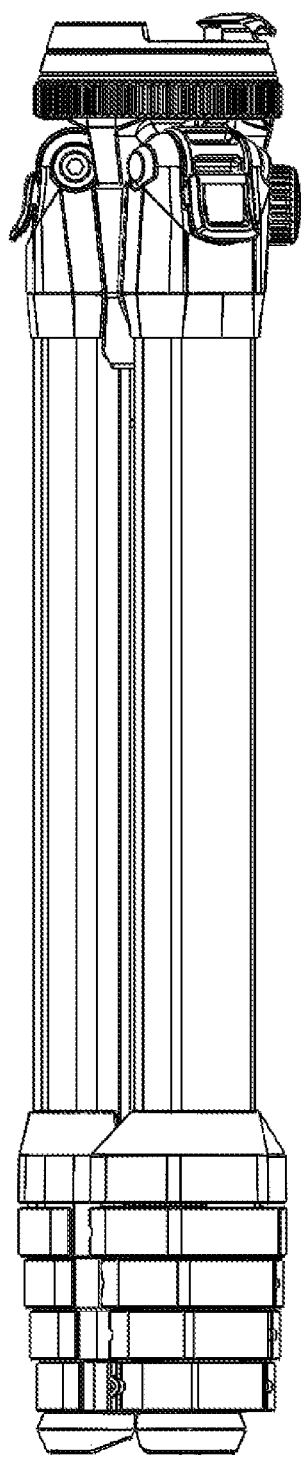
Figure 13:
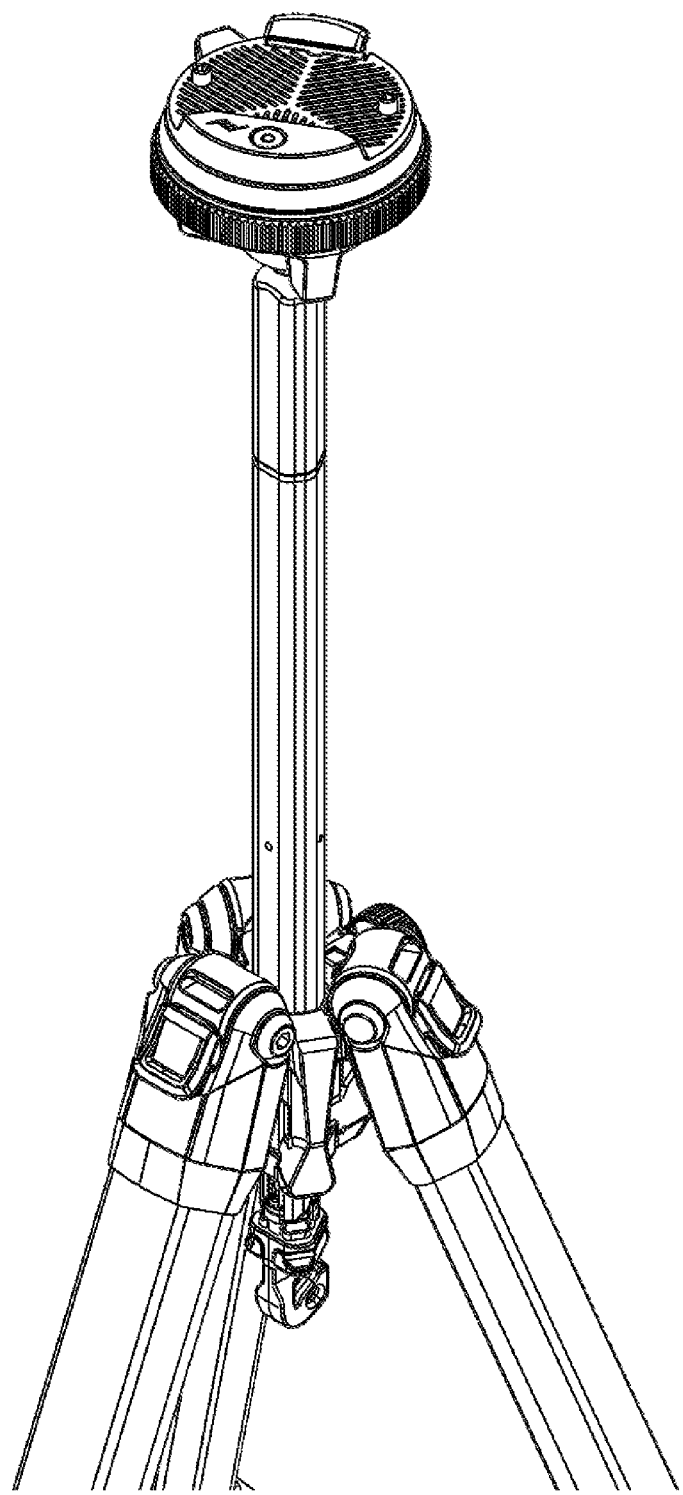
Figure 14:
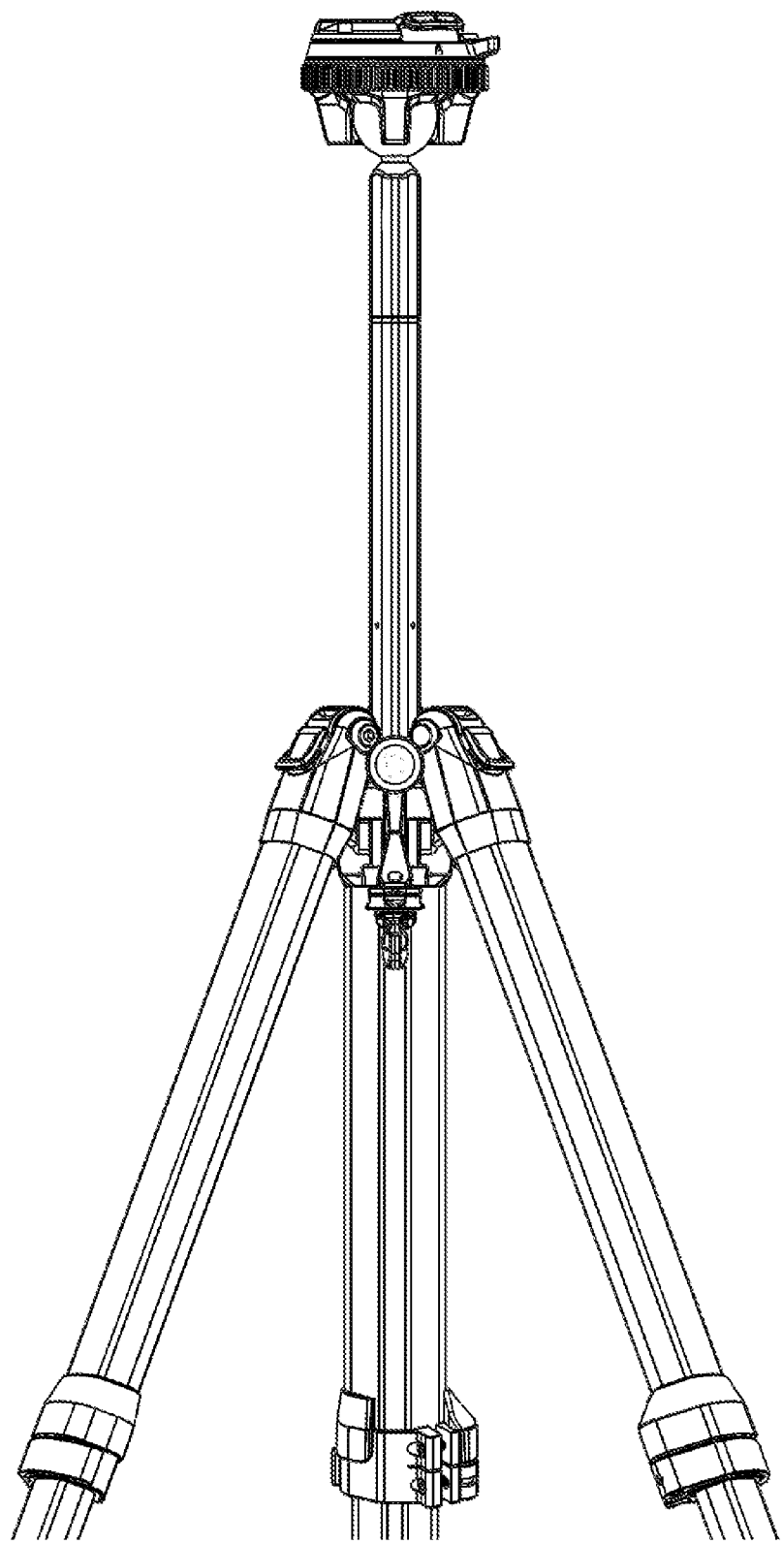
Figure 15:
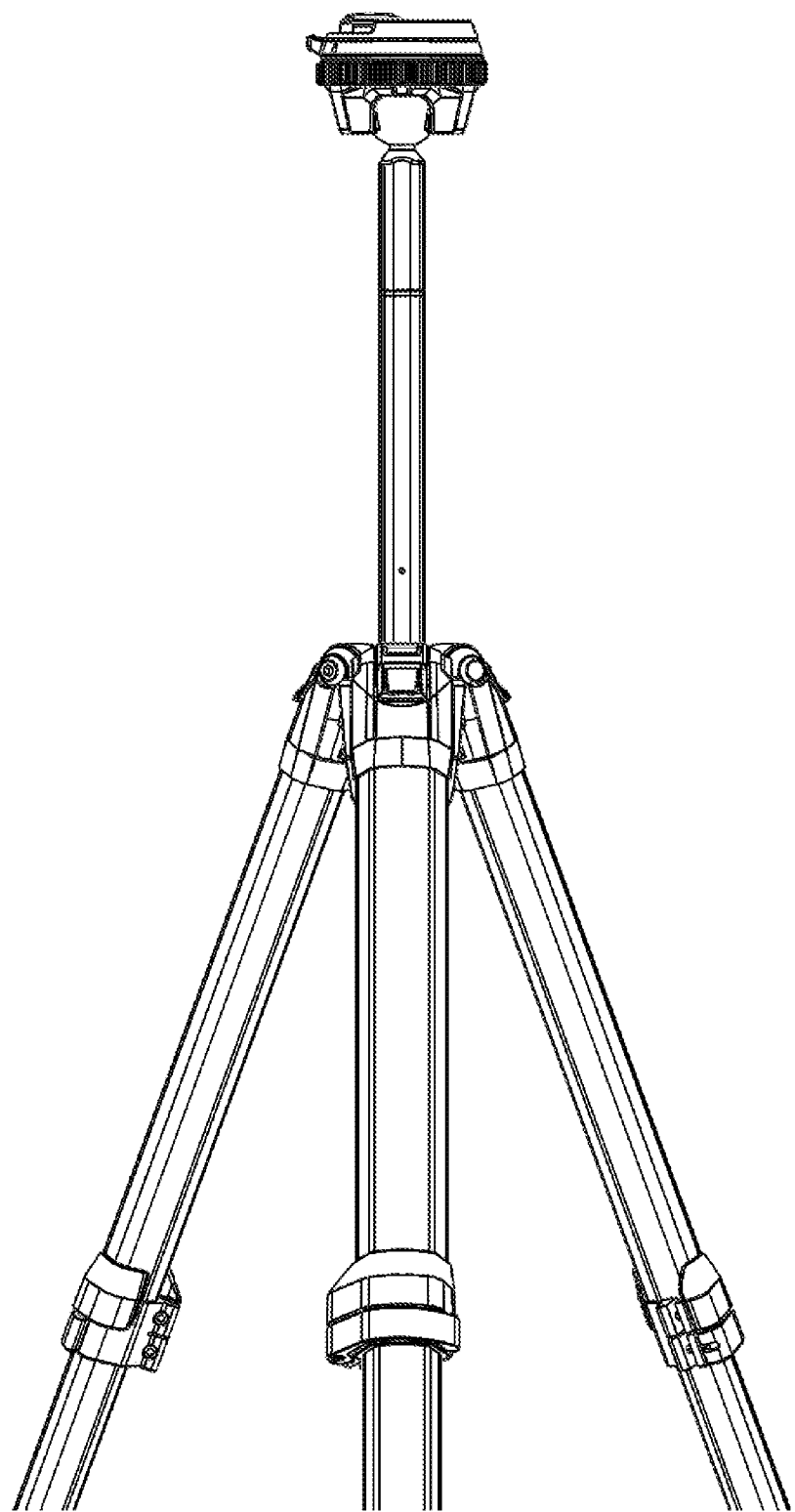
Figure 16:
Figure 17:
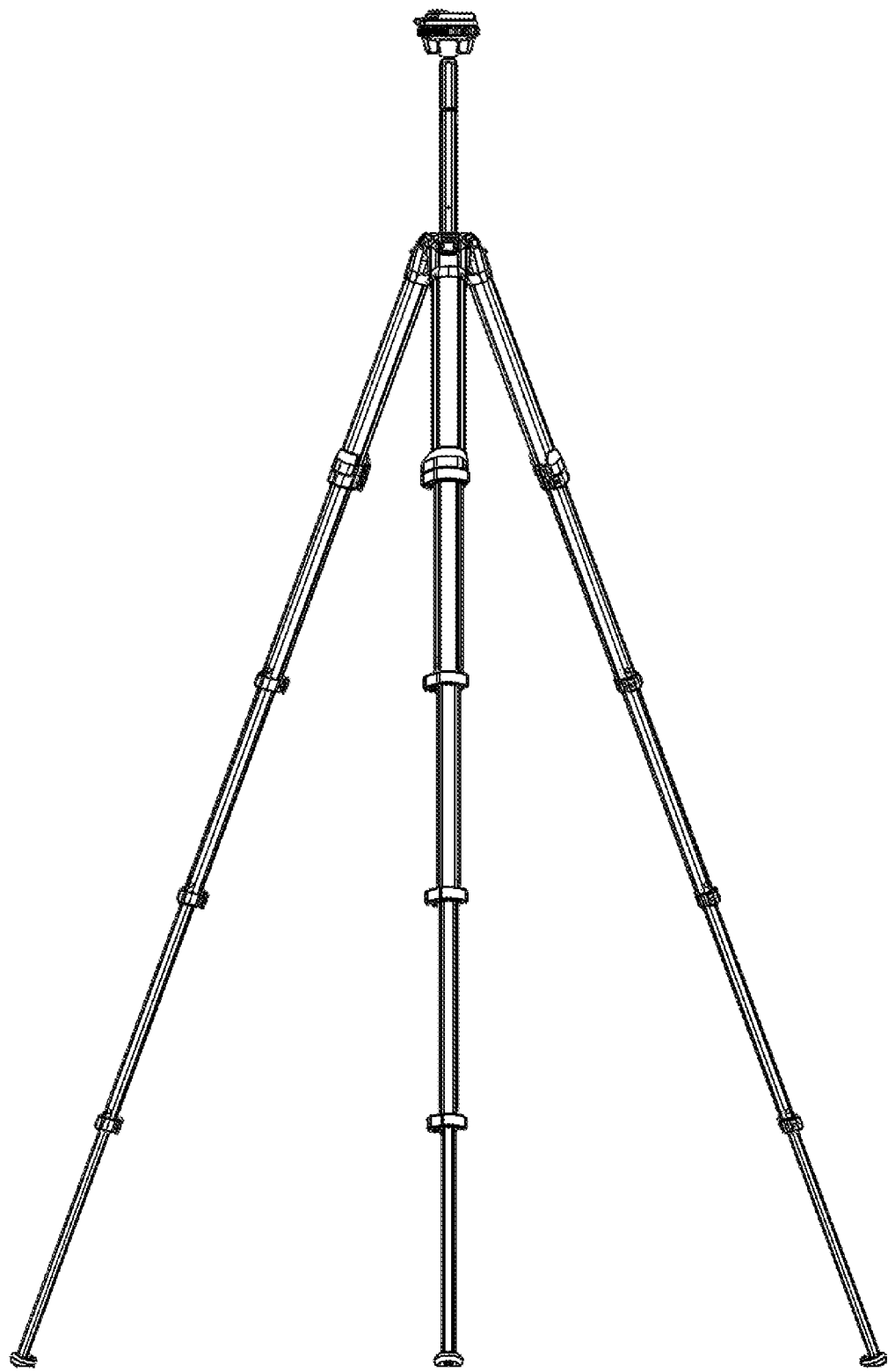
Figure 18:
Figure 19:
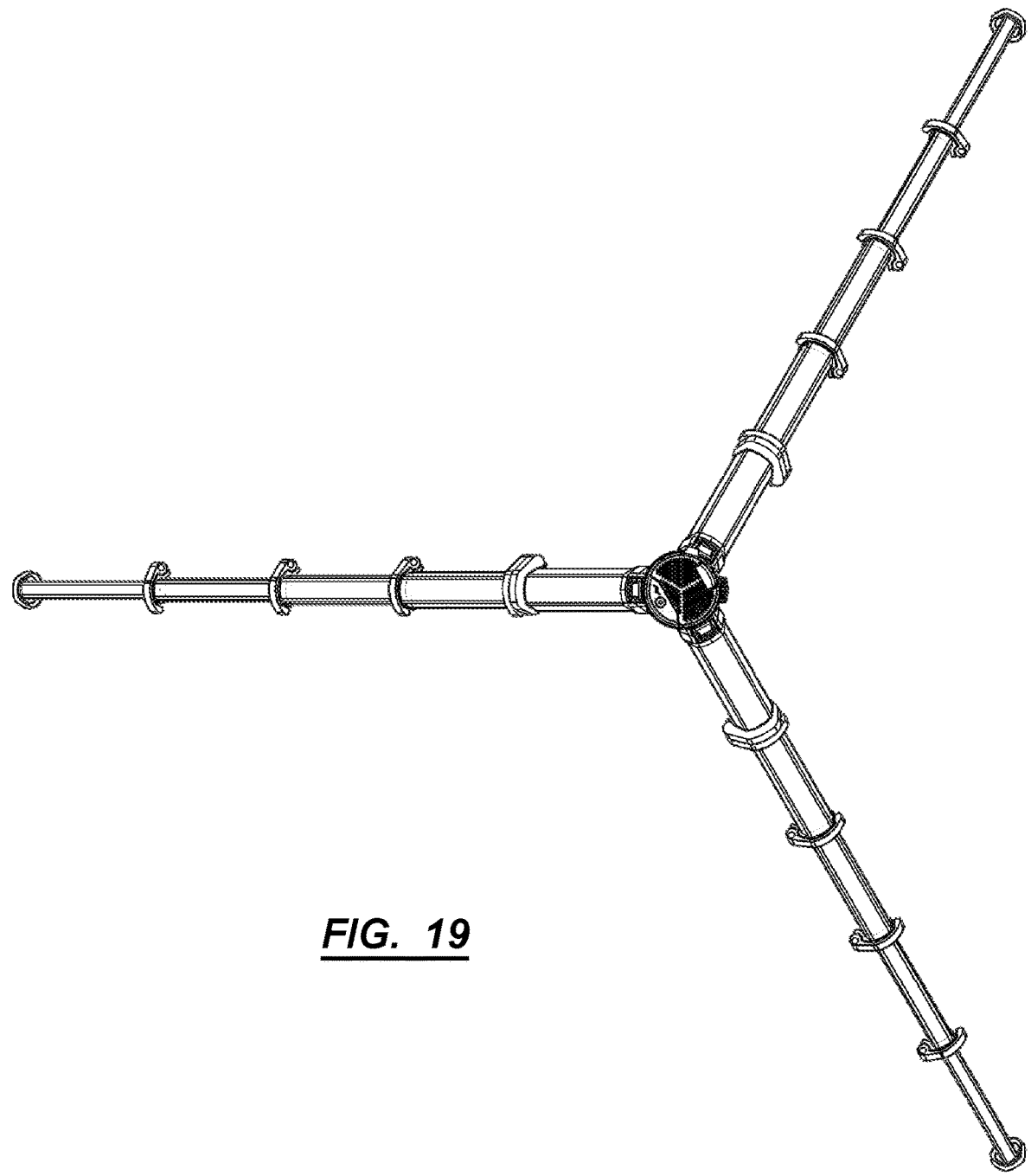
Figure 20:
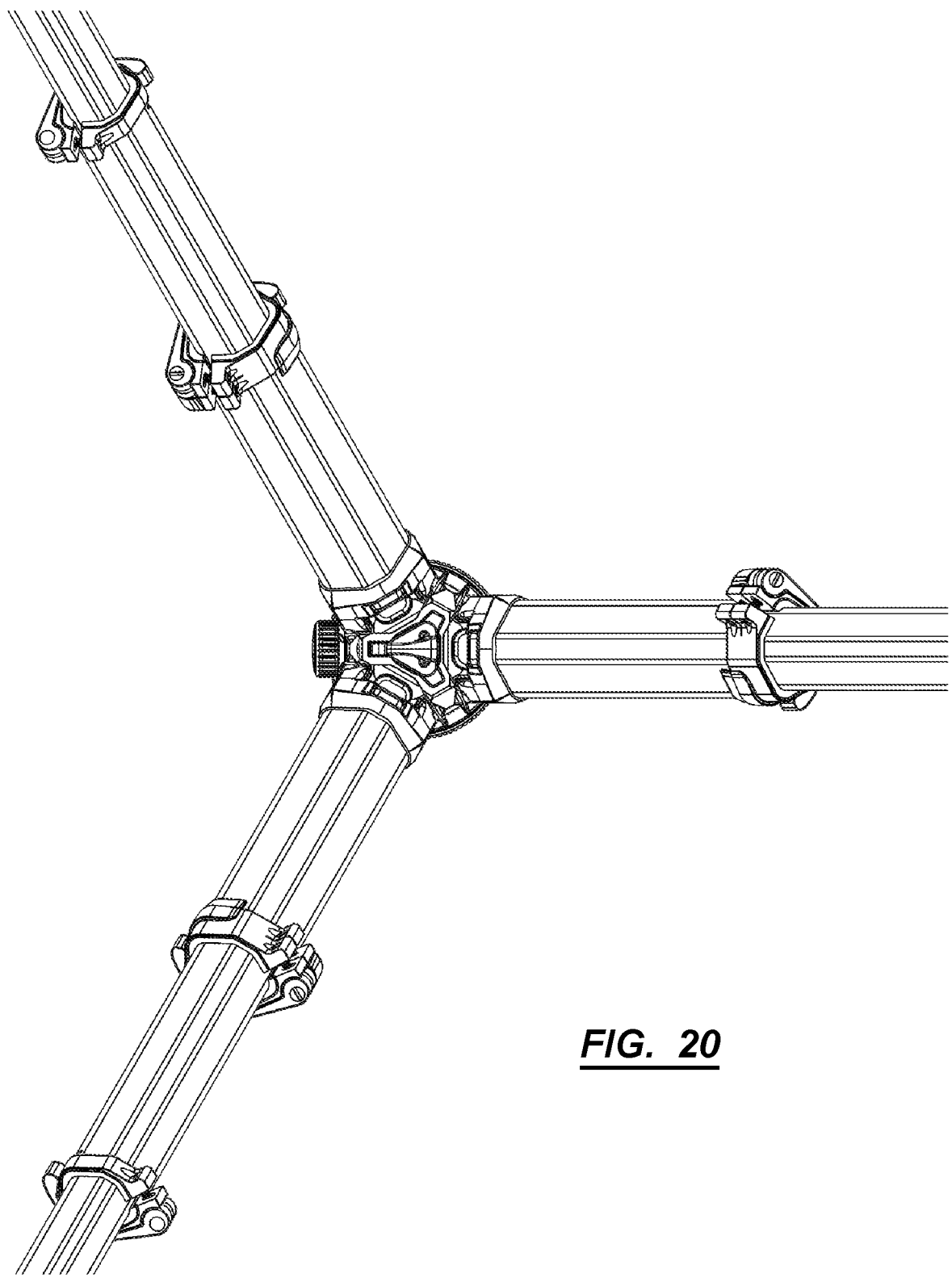
Figure 21:
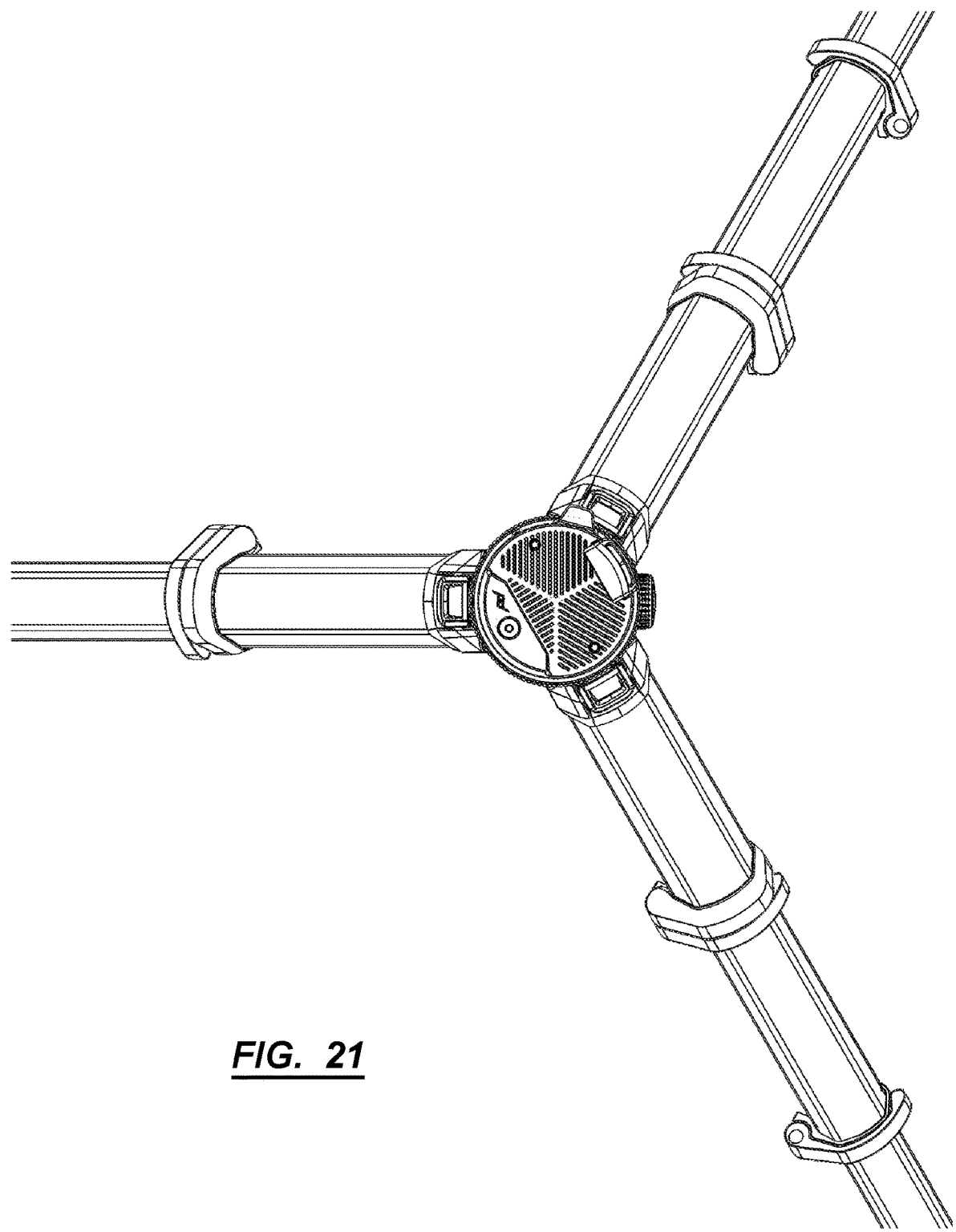
Figure 22:
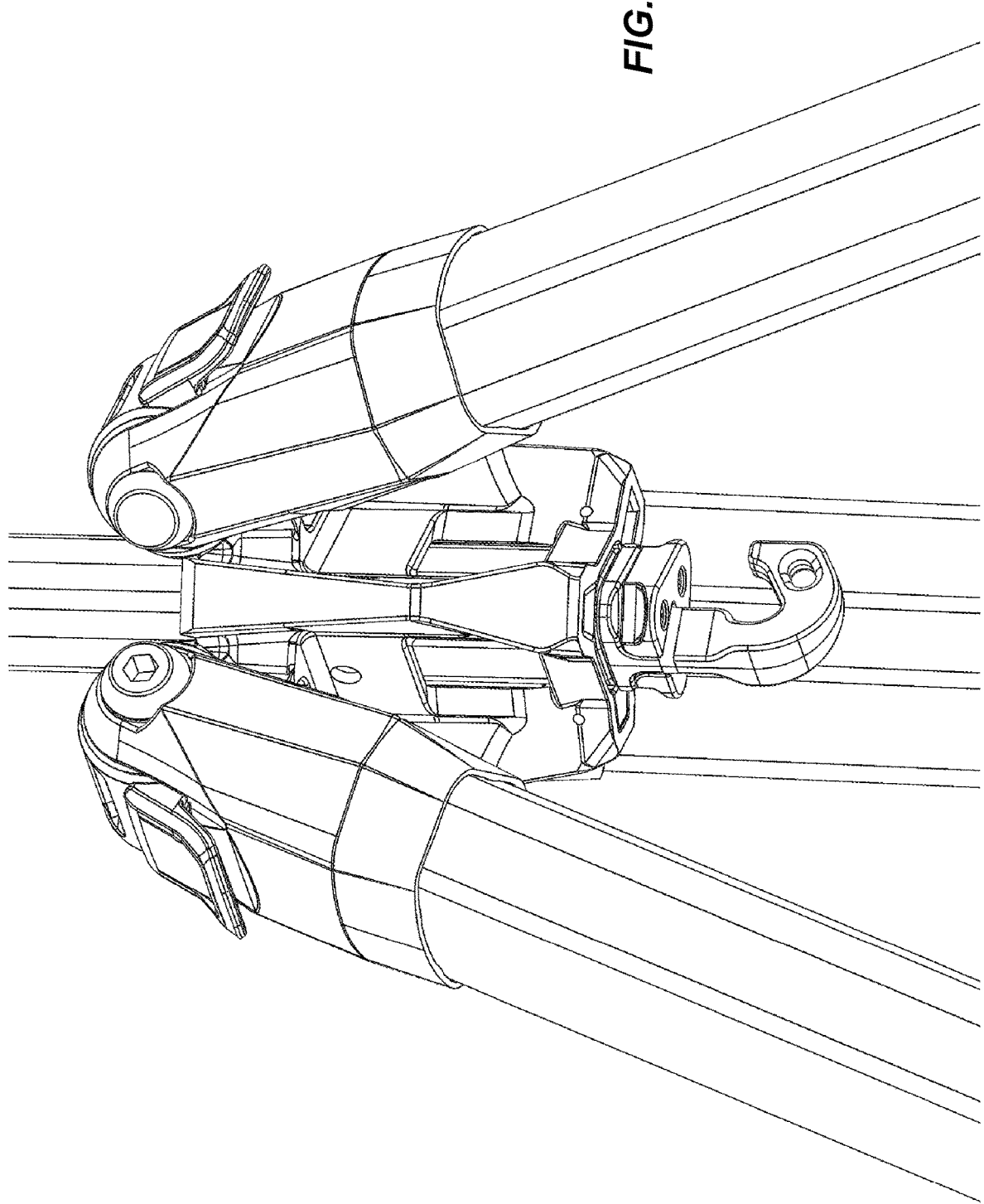
Figure 23:
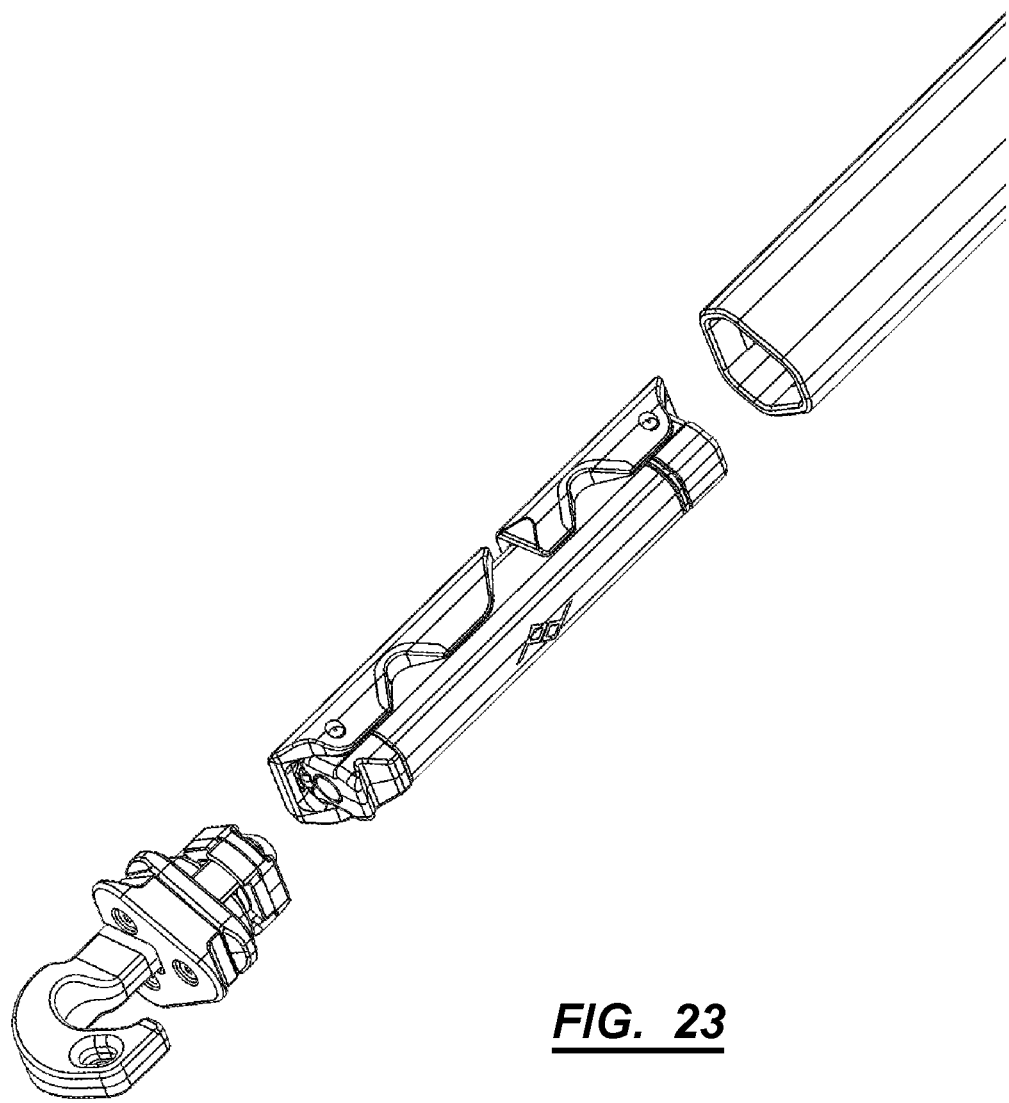
Figure 24:
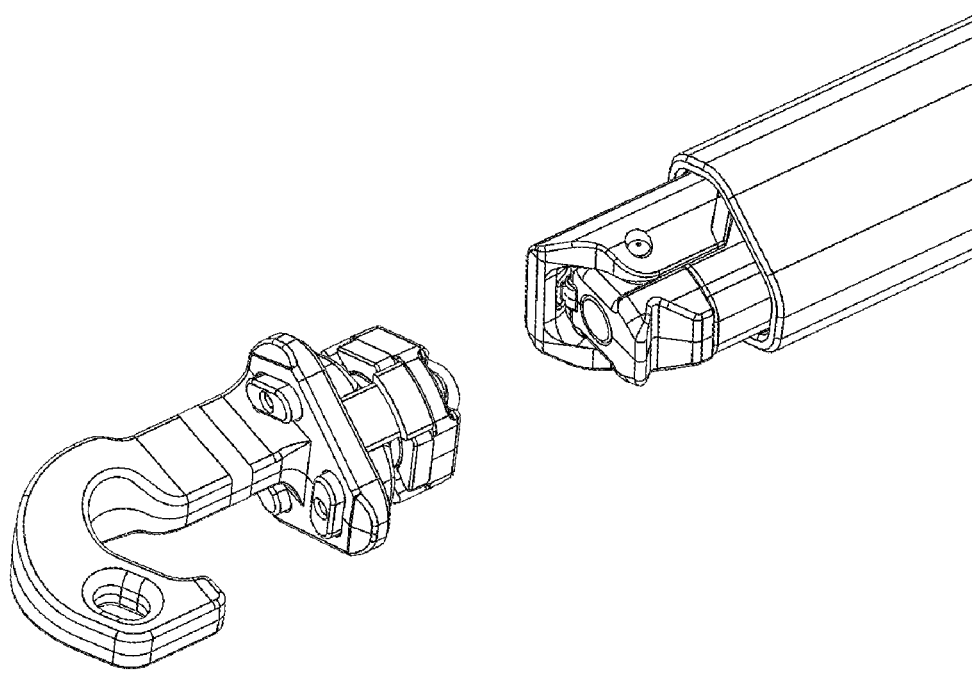

Furthermore, because each leg defines a width (e.g., spans an arc length about the center axis) greater than its depth, as shown in FIG. 6, each leg of the tripod 100 can thus exhibit a greater area moment of inertia in its bending axis and less deflection when subject to a yaw load than a round leg. Therefore, the legs can cooperate to resist deflection and minimize vibration in yaw as a user rotates a camera—loaded onto the chassis 140—such as when shooting a video pan of a car drive-by.

As a person skilled in the art will recognize from the previous detailed description and from the figures and claims, modifications and changes can be made to the embodiments of the invention without departing from the scope of this invention as defined in the following claims.

We claim:

1. A tripod comprising:
    a hub defining a center bore and a set of leg mounts arranged in a radial pattern about the center bore;
    a set of legs, each leg in the set of legs pivotably coupled to a leg mount in the set of leg mounts and configured to telescopically extend from the hub;
    a center column:
        configured to translate within the center bore of the hub; and
        comprising a spherical end configured to nest between the leg mounts; and
    a chassis pivotably coupled to the spherical end and comprising:
        a base section;
        a camera platform arranged over the base section, defining a ridge and a camera locking tab, and configured to transiently receive a camera adapter coupled to a camera;
        a set of flanges extending below the base section opposite the camera platform, extending around the spherical end, arranged in the radial pattern, and configured to nest between the leg mounts;
        a hat arranged in the base section over the spherical end; and
        a pivot control ring arranged about the base section, configured to drive the hat into the spherical end to fix an orientation of the chassis on the spherical end responsive to rotation in a first direction about the base section, and configured to retract the hat from the spherical end to unlock the chassis from the spherical end responsive to rotation in a second direction about the base section.

2. The tripod of claim 1:
    wherein the chassis further comprises:
        a threaded section extending along a central axis of the chassis and arranged over the spherical end;
        a sun gear threaded onto the threaded section and configured to translate along the threaded section when rotated;
        a spring arranged between the hat and the sun gear and configured to depress the hat against the spherical end; and
        a set of planet gears arranged about and meshed with the sun gear;
    wherein the hat is arranged on the sun gear and is facing the spherical end;
    wherein the pivot control ring comprises a ring gear meshed with the set of planet gears, and configured to:
        rotate the sun gear about the threaded section via the set of planet gears, drive the hat toward the spherical end, clamp the spherical end against the set of flanges, and fix an orientation of the chassis on the spherical end responsive to rotation in the first direction about the base section; and
        rotate the sun gear about the threaded section via the set of planet gears, retract the hat from the spherical end, and unlock the chassis from the spherical end responsive to rotation in the second direction opposite the first direction.

3. The tripod of claim 1, wherein the chassis further comprises a camera lock ring:
    arranged proximal the pivot control ring;
    concentric with the pivot control ring; and
    configured to drive the camera locking tab toward the ridge to transiently lock the camera adapter between the camera locking tab and the ridge.

4. The tripod of claim 3, wherein the chassis further comprises a panning control ring:
    interposed between the base section and the upper section;
    configured to lock rotation of the camera platform about a pan axis of the chassis responsive to rotation in the first direction; and
    configured to unlock rotation of the camera platform about the pan axis responsive to rotation in the second direction.

5. The tripod of claim 4, wherein the chassis comprises a set of control rings:
    comprising the camera lock ring, the panning control ring, and the pivot control ring;
    arranged in a set of parallel planes about the central axis of the chassis; and
    configured to rotate about the central axis of the chassis.

6. The tripod of claim 1, wherein each leg mount in the set of leg mounts defines a stop configured to locate a leg in the set of legs at a first angle approximately between 23 degrees and 27 degrees from a central axis of the center column in an open position.

7. The tripod of claim 6, wherein each leg in the set of legs:
    is operable in a set of configurations comprising a first position, the open position, and a low position;
    is approximately parallel to the central axis in the collapsed position;
    extends outwardly from the hub at the first angle from the central axis in the open position; and
    extends outwardly from the hub at a second angle between 83 degrees and 87 degrees from the central axis in the low position.

8. The tripod of claim 1, wherein the chassis further comprises a spring arranged behind the hat opposite the spherical end and configured to bias the hat onto the spherical end to withhold rotation of the chassis relative to the spherical end during rotation of the pivot control ring in the first direction.

9. The tripod of claim 8:
    wherein the spherical end comprises an outer covering;
    wherein each flange, in the set of flanges, comprises a contact surface facing the spherical end and configured to contact the outer covering of the spherical end; and
    wherein the spring is configured to clutch the spherical end between the hat and contact surfaces of the set of flanges during rotation of the pivot control ring.

10. The tripod of claim 1:
    wherein the center bore constrains rotation of the center column relative to the hub; and
    wherein the center column is configured to translate linearly through the center bore to adjust a height of the chassis, pivotably coupled to the spherical end, above the hub.

11. The tripod of claim 1:
further comprising a mobile mount configured to:
   transiently attach to the camera platform; and
   expand from a collapsed state to an open state to retain a mobile device; and
wherein the center column defines a cavity, opposite the spherical end, configured to house the mobile mount in the collapsed state.

12. The tripod of claim 1:
wherein the center bore defines a tri-lobed opening with lobes radially centered between leg mounts in the set of leg mounts;
wherein the center column defines a tri-lobed cross-section; and
wherein each leg in the set of legs comprises a shaft defining an inner face nesting against and facing the center column.

13. The tripod of claim 12:
wherein each leg in the set of legs defines a width spanning an arc length about the center column and a depth extending outward from the center column, the width greater than the depth; and
wherein the shaft of each leg, in the set of legs, further defines:
   a set of two inward-facing faces adjacent the inner face and configured to nest against and facing an inward-facing face of an adjacent leg; and
   a set of outward-facing faces opposite the inner face.

14. The tripod of claim 1:
wherein the set of legs pivot about pivot axes intersecting a horizontal pivot plane;
wherein the spherical end:
   is characterized by a spherical center and a spherical radius; and
   is configured to nest between the leg mounts with the spherical center offset from the horizontal pivot plane by less than the spherical radius; and
wherein the set of flanges are configured to nest between the leg mounts with bottom sections of the set of flanges extending below the horizontal pivot plane.

15. The tripod of claim 1, further comprising a hanging hook comprising:
   a first end defining a hook configured to carry a weighted body; and
   a second end opposite the hook and configured to attach to a distal end of the center column opposite the chassis to prevent passage of the distal end through the center bore of the hub.

16. A tripod comprising:
a spherical end; and
a chassis pivotably coupled to the spherical end and comprising:
   a base section;
   a camera platform arranged over the base section and configured to transiently receive a camera adapter coupled to a camera;
   a threaded section extending along a central axis of the chassis and arranged over the spherical end;
   a sun gear threaded onto the threaded section and configured to translate along the threaded section when rotated;
   a hat arranged on to the sun gear and facing the spherical end;
   a spring arranged between the hat and the sun gear and configured to depress the hat against the spherical end;
   a set of planet gears arranged about and meshed with the sun gear;
   a set of flanges extending from the base section opposite the camera platform, extending around a section of the spherical end, and arranged in a radial pattern about the spherical end; and
   a pivot control ring arranged about the base section, comprising a ring gear meshed with the set of planet gears, and configured to:
      rotate the sun gear about the threaded section via the set of planet gears, drive the hat toward the spherical end, clamp the spherical end against the set of flanges, and fix an orientation of the chassis on the spherical end responsive to rotation in a first direction about the base section; and
      rotate the sun gear about the threaded section via the set of planet gears, retract the hat from the spherical end, and unlock the chassis from the spherical end responsive to rotation in a second direction opposite the first direction.

17. The tripod of claim 16:
wherein the camera platform defines a ridge and a camera locking tab; and
further comprising a camera lock ring:
   arranged proximal the pivot control ring;
   concentric with the pivot control ring; and
   configured to drive the camera locking tab toward the ridge to transiently lock the camera adapter between the camera locking tab and the ridge.

18. The tripod of claim 17, further comprising:
a panning control ring arranged about the chassis between the camera lock ring and the pivot control ring;
configured to lock the camera platform to the base section responsive to rotation in the first direction; and
configured to unlock the camera platform from the base section responsive to rotation in the second direction.

19. The method of claim 17:
further comprising:
   a hub defining a center bore and a set of leg mounts arranged in the radial pattern about the center bore; and
   a set of legs, each leg in the set of legs pivotably coupled to a leg mount in the set of leg mounts and configured to telescopically extend down from the hub; and
wherein the set of flanges are configured to nest between the leg mounts.

20. The tripod of claim 19:
further comprising a center column configured to translate within the center bore of the hub; and
wherein the spherical end is coupled to an end of the center column opposite the set of legs and is configured to nest between the leg mounts.

* * * * *